US007817297B2

(12) United States Patent
Ushida et al.

(10) Patent No.: US 7,817,297 B2
(45) Date of Patent: Oct. 19, 2010

(54) IMAGE PROCESSING APPARATUS AND IMAGE PROCESSING METHOD

(75) Inventors: Katsutoshi Ushida, Kanagawa (JP); Yuichi Naoi, Saitama (JP); Yoshiaki Katahira, Chiba (JP); Koichi Morishita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1112 days.

(21) Appl. No.: 10/739,345

(22) Filed: Dec. 19, 2003

(65) Prior Publication Data

US 2004/0130750 A1 Jul. 8, 2004

(30) Foreign Application Priority Data

Dec. 26, 2002 (JP) ............................. 2002-378688

(51) Int. Cl.
*G06K 15/00* (2006.01)
*H04N 1/405* (2006.01)
*H04N 1/04* (2006.01)
*G06F 12/00* (2006.01)
*G06K 9/54* (2006.01)

(52) U.S. Cl. ...................... 358/1.16; 358/3.1; 358/474; 711/167; 382/304

(58) Field of Classification Search ................ 358/1.16, 358/505, 524, 1.15, 1.13, 474, 488, 504, 358/1.18, 1.9, 1.1, 1.17, 404, 1.11, 448; 710/26, 710/17, 18, 19, 38, 52, 3, 4, 25, 22, 23, 24; 713/1; 712/245, 35, 241; 718/106; 711/167; 709/223; 345/534, 571, 536, 537, 543, 658; 379/100.06; 382/297

See application file for complete search history.

(56) References Cited

U.S. PATENT DOCUMENTS 4,811,281 A 3/1989 Okamoto et al. ............ 364/900

(Continued)

FOREIGN PATENT DOCUMENTS

CN 1297303 5/2001

(Continued)

OTHER PUBLICATIONS

"Direct Memory Access" http://whatis.techtarget.com/definition/0,289893,sid9_gci213903,00.html.

(Continued)

*Primary Examiner*—Edward L Coles
*Assistant Examiner*—Neil R McLean
(74) *Attorney, Agent, or Firm*—Fitzpatrick, Cella, Harper & Scinto

(57) ABSTRACT

To provide an image processing technique compatible with both a CCD and a CIS, which controls storage of image data read by each device in a memory and the read of the stored data for each rectangular area to obtain a high memory efficiency, an image processing apparatus includes an input section which executes input processing of image data read by an image reading device in accordance with the data output format of the device, an output data control section which distributes the image data that has undergone the input processing by the input section in accordance with the output format of the image reading device, an address generation section which generates address information corresponding to the output format to store the distributed image data in a memory, and a memory control section which DMA-transfers the distributed image data to the memory and stores the image data on the basis of the generated address information.

13 Claims, 33 Drawing Sheets

U.S. PATENT DOCUMENTS

| | | | |
|---|---|---|---|
| 4,967,274 A | 10/1990 | Sonoda | 358/160 |
| 5,193,169 A | 3/1993 | Ishikawa | 395/425 |
| 5,425,135 A | 6/1995 | Motoyama et al. | 358/1.15 |
| 5,530,901 A | 6/1996 | Nitta | 395/848 |
| 5,566,253 A | 10/1996 | Nakashima et al. | 382/299 |
| 5,642,208 A | 6/1997 | Takahashi et al. | 358/501 |
| 5,923,339 A | 7/1999 | Date et al. | 345/505 |
| 5,937,152 A | 8/1999 | Oda et al. | |
| 6,023,281 A | 2/2000 | Grigor et al. | 345/512 |
| 6,025,875 A | 2/2000 | Vu et al. | 348/241 |
| 6,084,686 A | 7/2000 | Ushida | 358/1.16 |
| 6,084,813 A | 7/2000 | Kikuchi et al. | 365/222 |
| 6,130,758 A * | 10/2000 | Funazaki | 358/1.15 |
| 6,595,612 B1 | 7/2003 | Brown et al. | 347/9 |
| 6,633,975 B1 * | 10/2003 | Sawada et al. | 713/1 |
| 6,912,638 B2 * | 6/2005 | Hellman et al. | 711/167 |
| 6,944,358 B2 * | 9/2005 | Morimoto et al. | 382/304 |
| 7,027,190 B2 * | 4/2006 | Namizuka et al. | 358/3.1 |
| 7,116,449 B1 * | 10/2006 | Toriyama et al. | 358/474 |
| 7,170,553 B2 | 1/2007 | Matsuki et al. | |
| 2002/0159656 A1 | 10/2002 | Matsuki et al. | 382/305 |
| 2004/0130553 A1 | 7/2004 | Ushida et al. | 45/531 |

FOREIGN PATENT DOCUMENTS

| | | |
|---|---|---|
| EP | 1 193 610 | 4/2002 |
| JP | 01-278173 | 11/1989 |
| JP | 2-311050 | 12/1990 |
| JP | 07-147639 | 6/1995 |
| JP | 7-170372 | 7/1995 |
| JP | 09-247474 | 9/1997 |
| JP | 2862242 | 12/1998 |
| JP | 2000-032258 A | 1/2000 |
| JP | 2000-148999 | 5/2000 |
| JP | 2000-322374 | 11/2000 |
| JP | 2001-144920 | 5/2001 |
| JP | 2002-252749 | 9/2002 |
| JP | 2002-328881 | 11/2002 |
| JP | 2002-359721 | 12/2002 |

OTHER PUBLICATIONS

U.S. Office Action dated Jun. 30, 2008 in U.S. Appl. No. 11/487,370.
Japanese Office Action dated Jun. 1, 2009 in Japanese Patent Application No. 2006-021423.

* cited by examiner

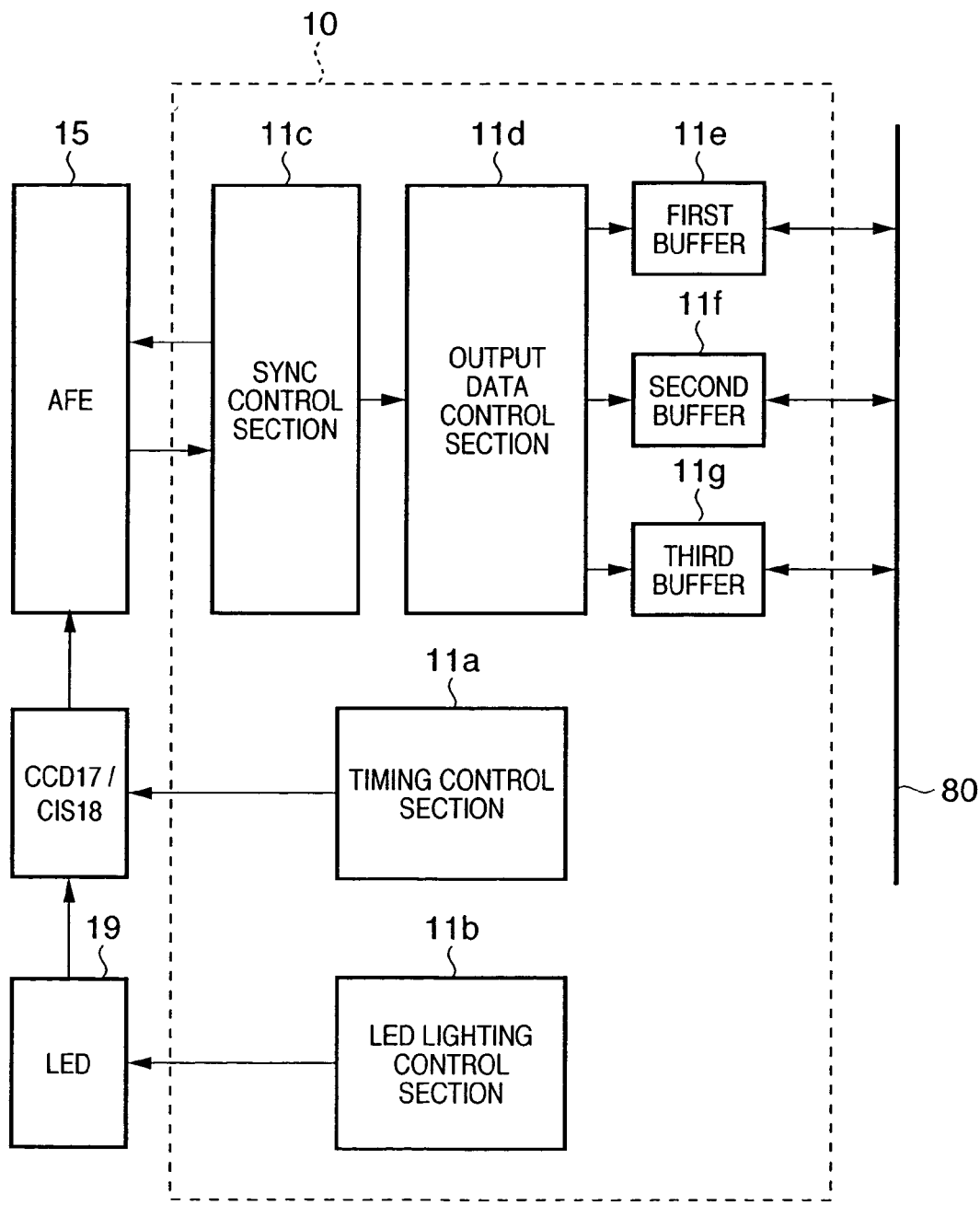

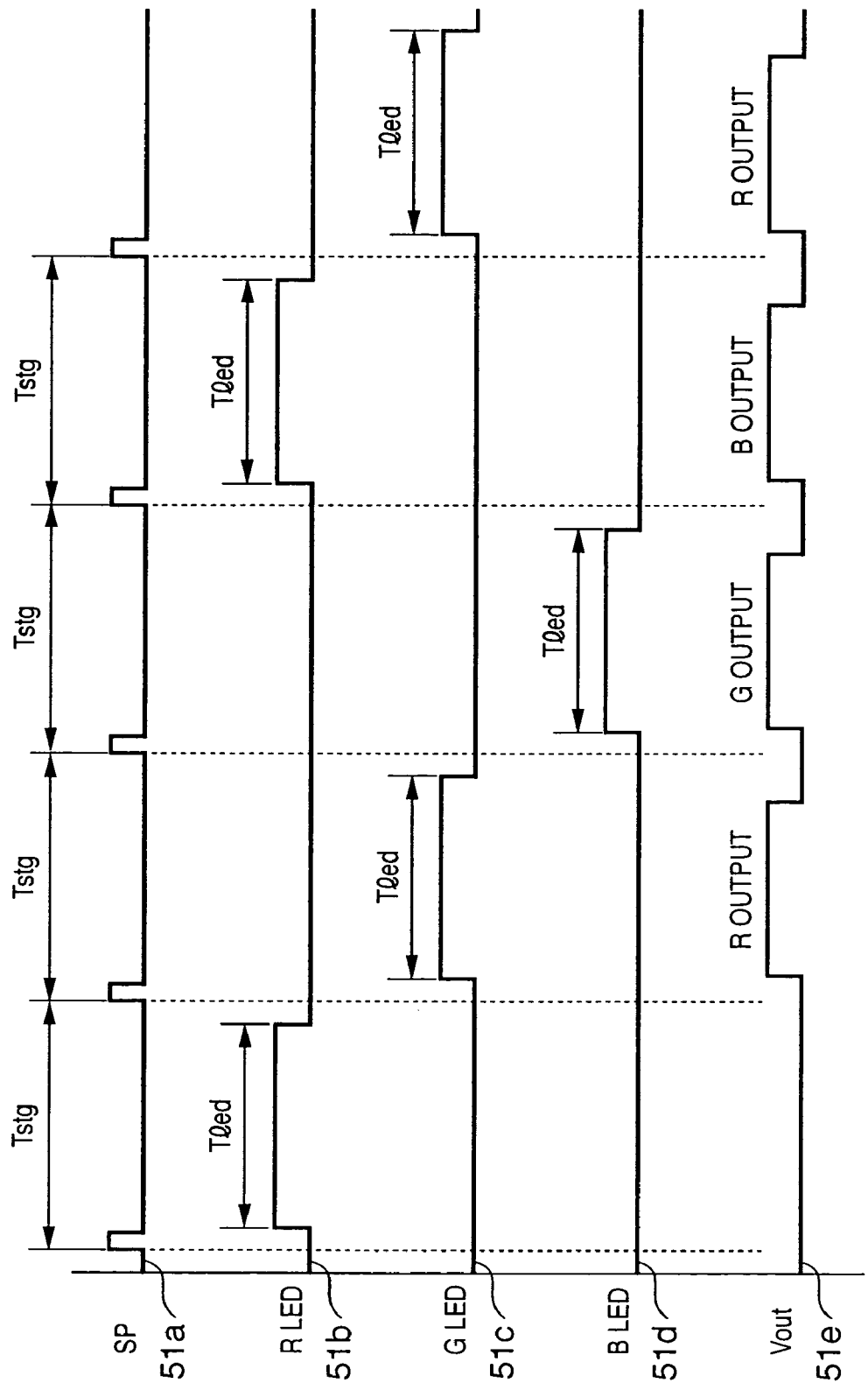

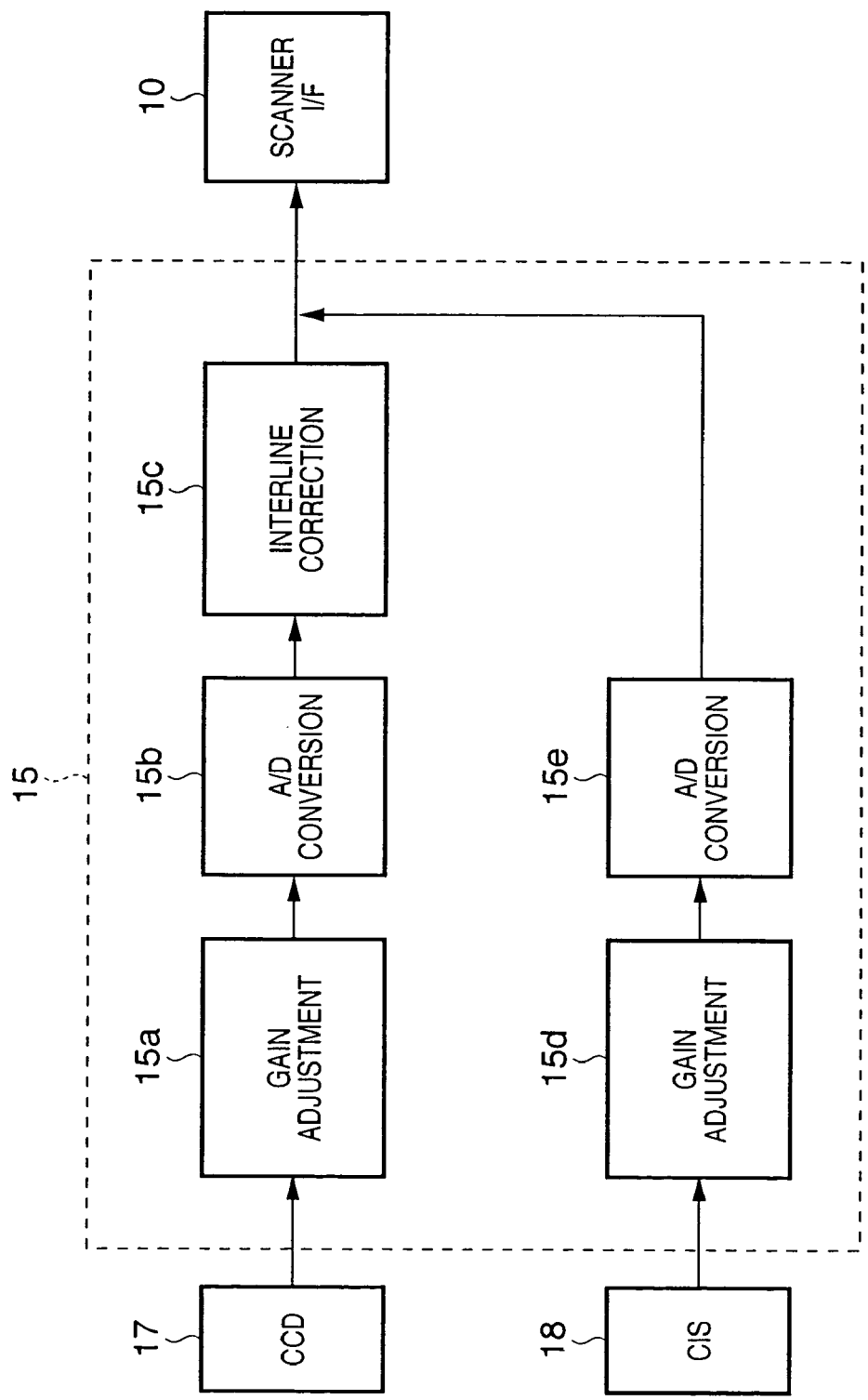

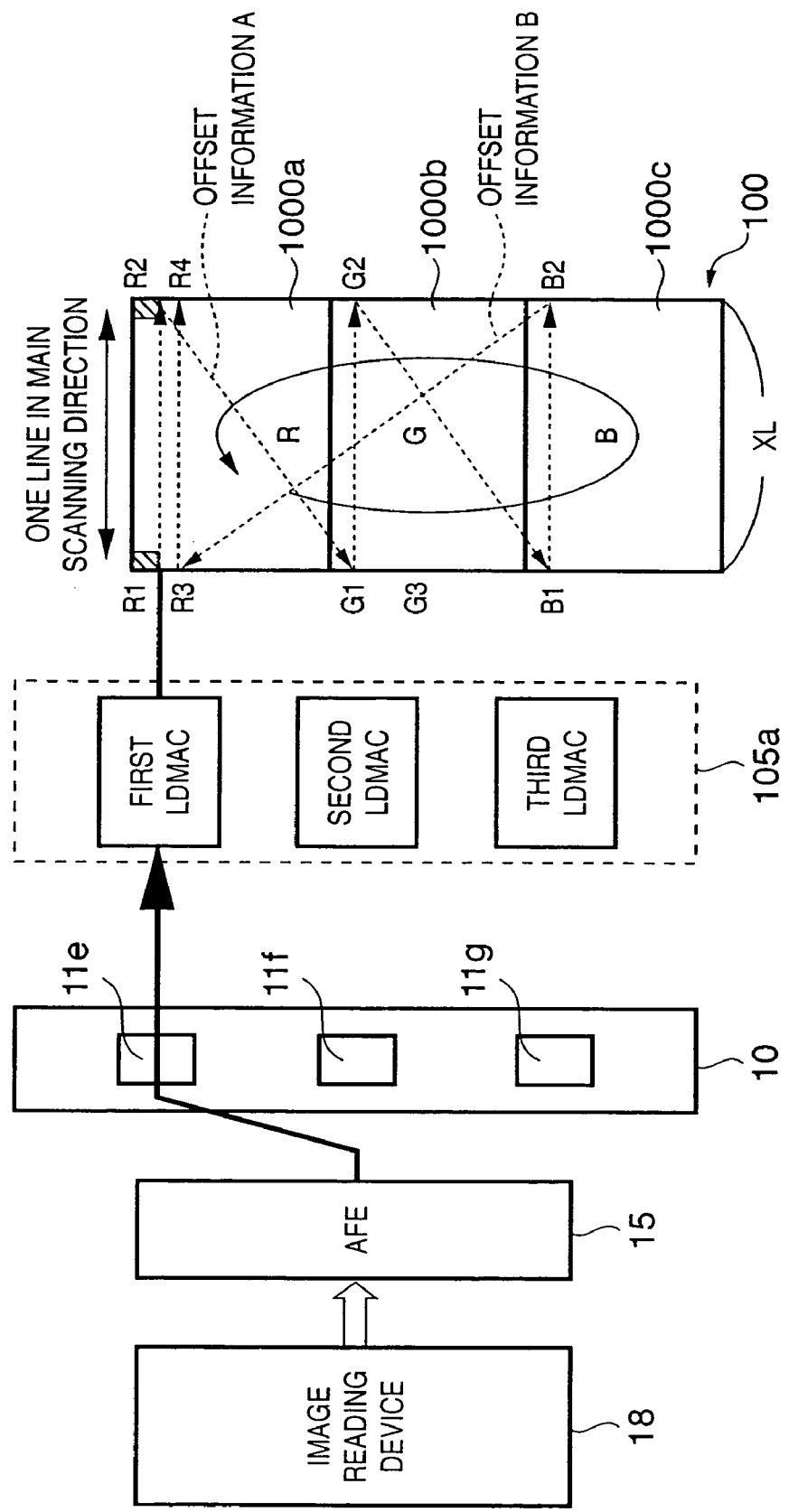

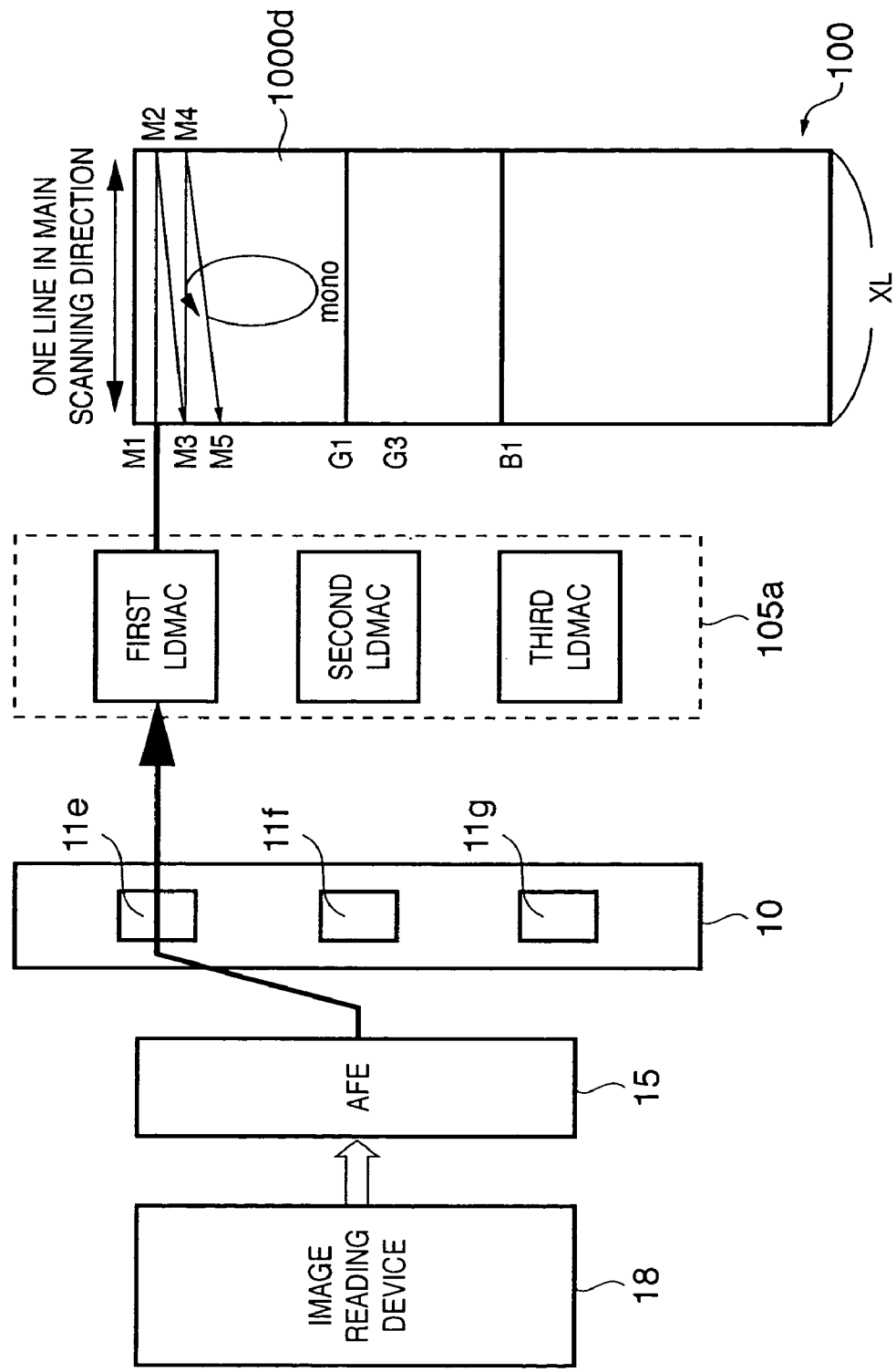

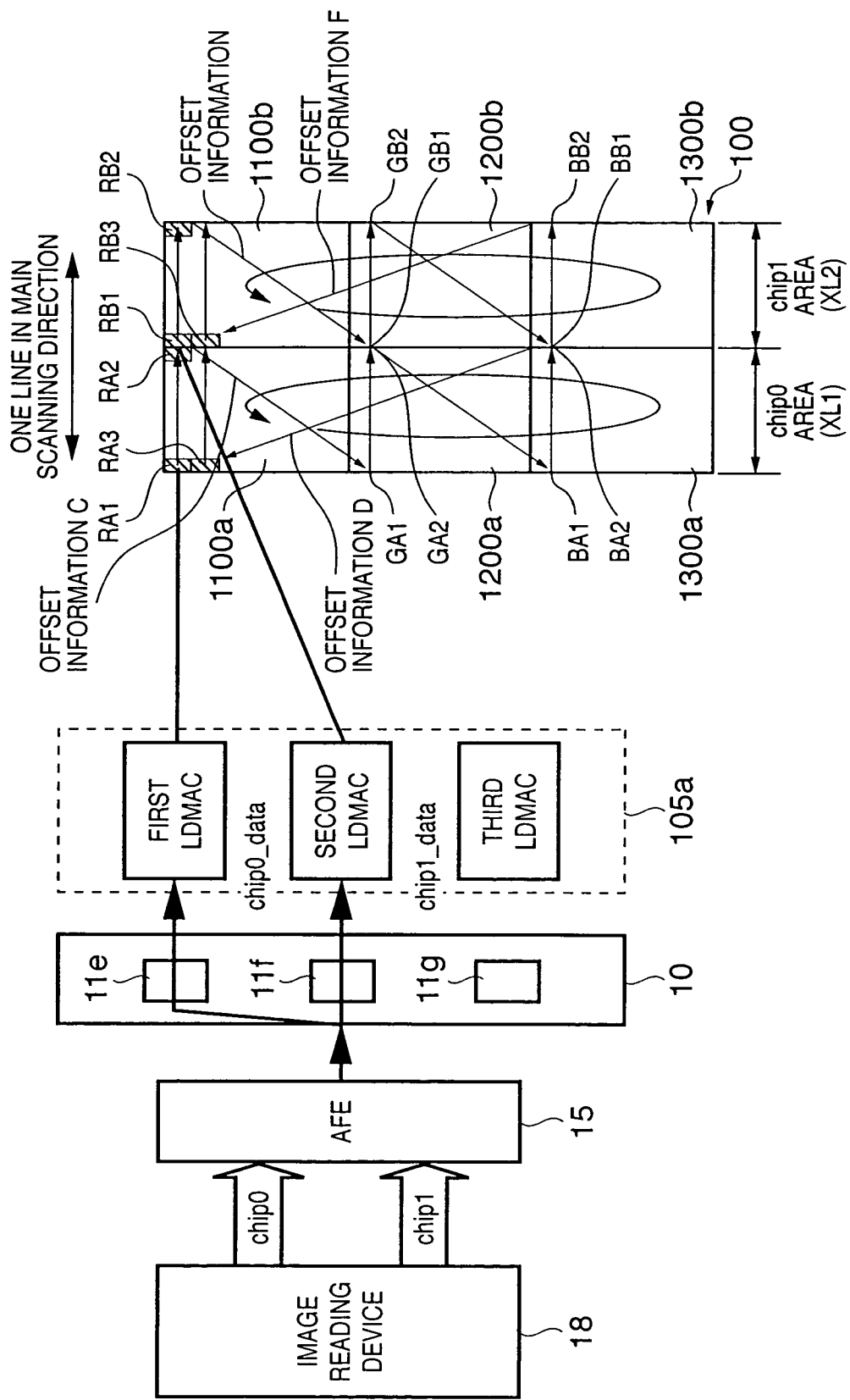

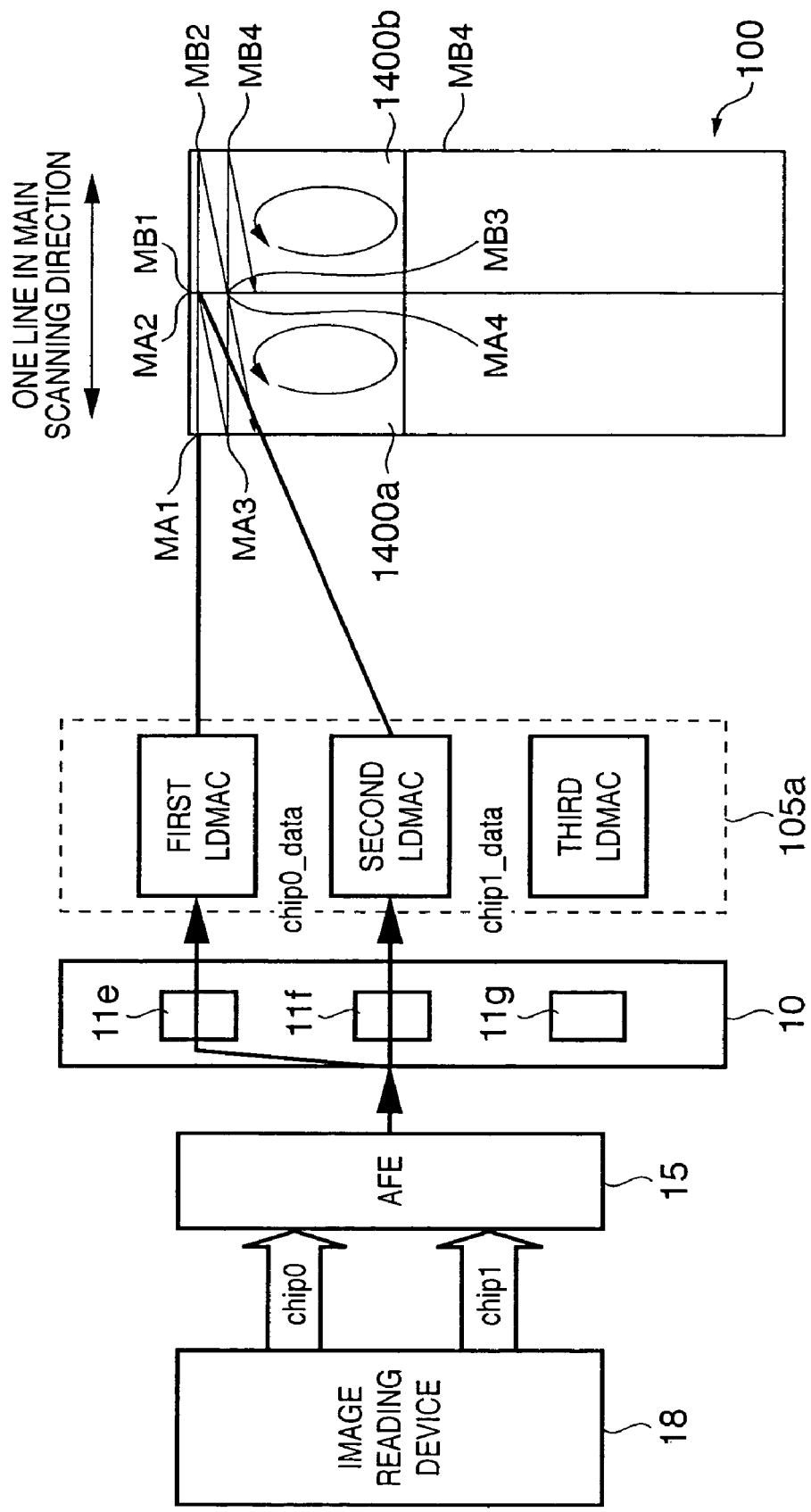

600 dpi COLOR COPY MODE 600 dpi MONOCHROME COPY MODE 1200 dpi SCAN MODE

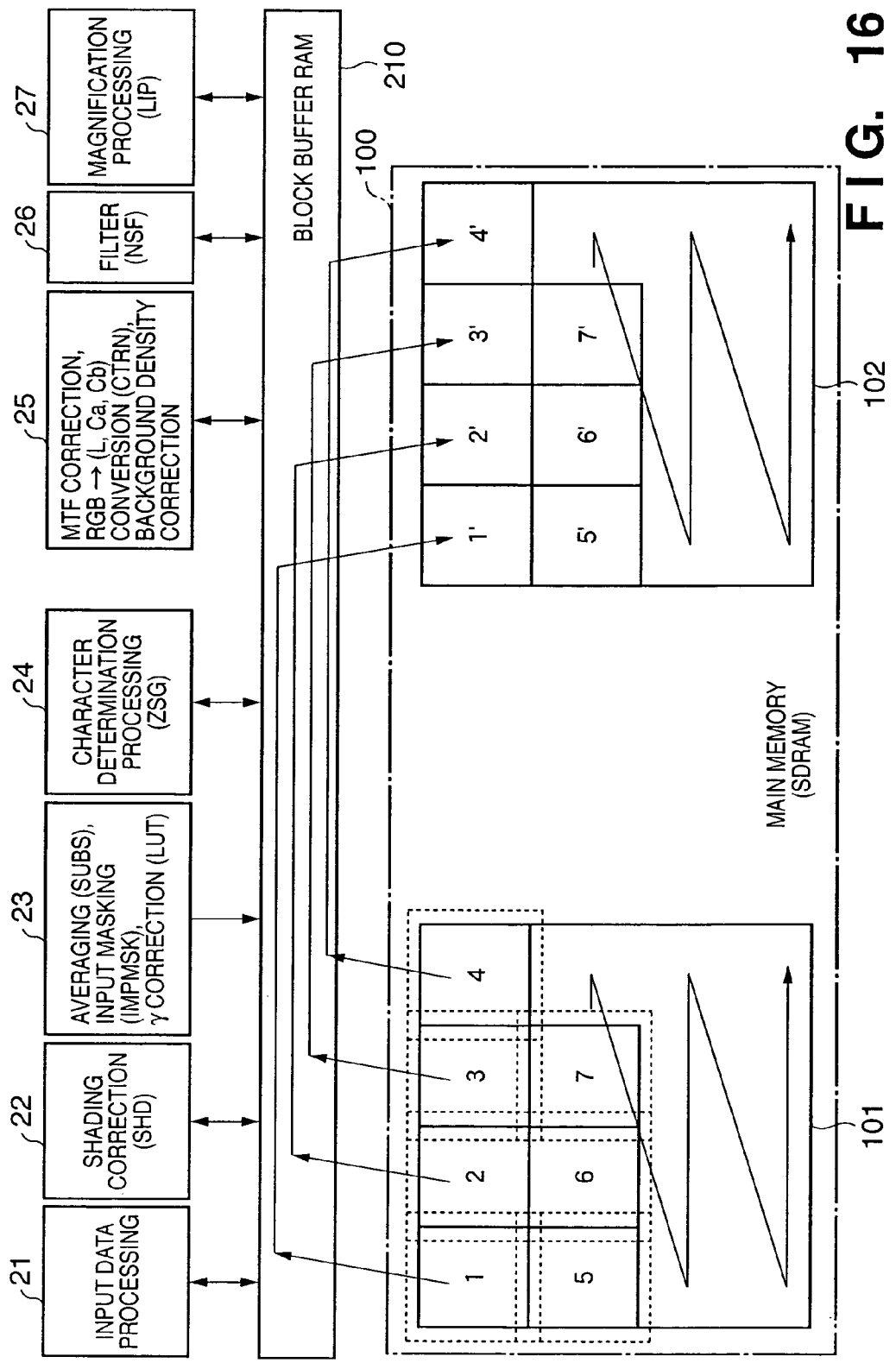

FIG. 18A

1× MODE

|  | Na+Nb | Nc+Nd |
|---|---|---|
| COLOR COPY | 24 | 21 |
| MONOCHROME COPY | 4 | 4 |
| SCANNER | 0 | 0 |

FIG. 18B

MAGNIFICATION MODE

|  | Na+Nb | Nc+Nd |
|---|---|---|
| COLOR COPY | 24+m | 21+n |
| MONOCHROME COPY | 4+m | 4+n |
| SCANNER | m | n |

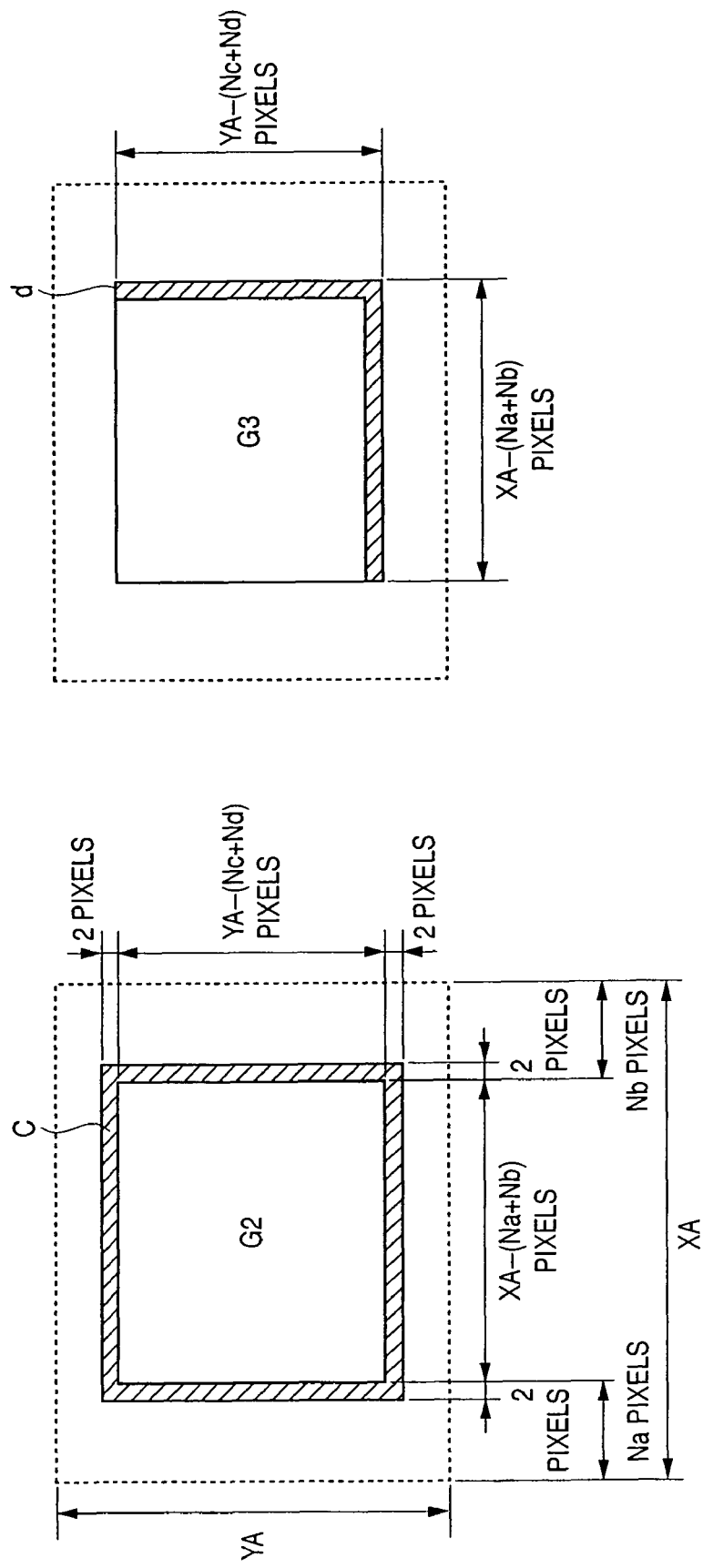

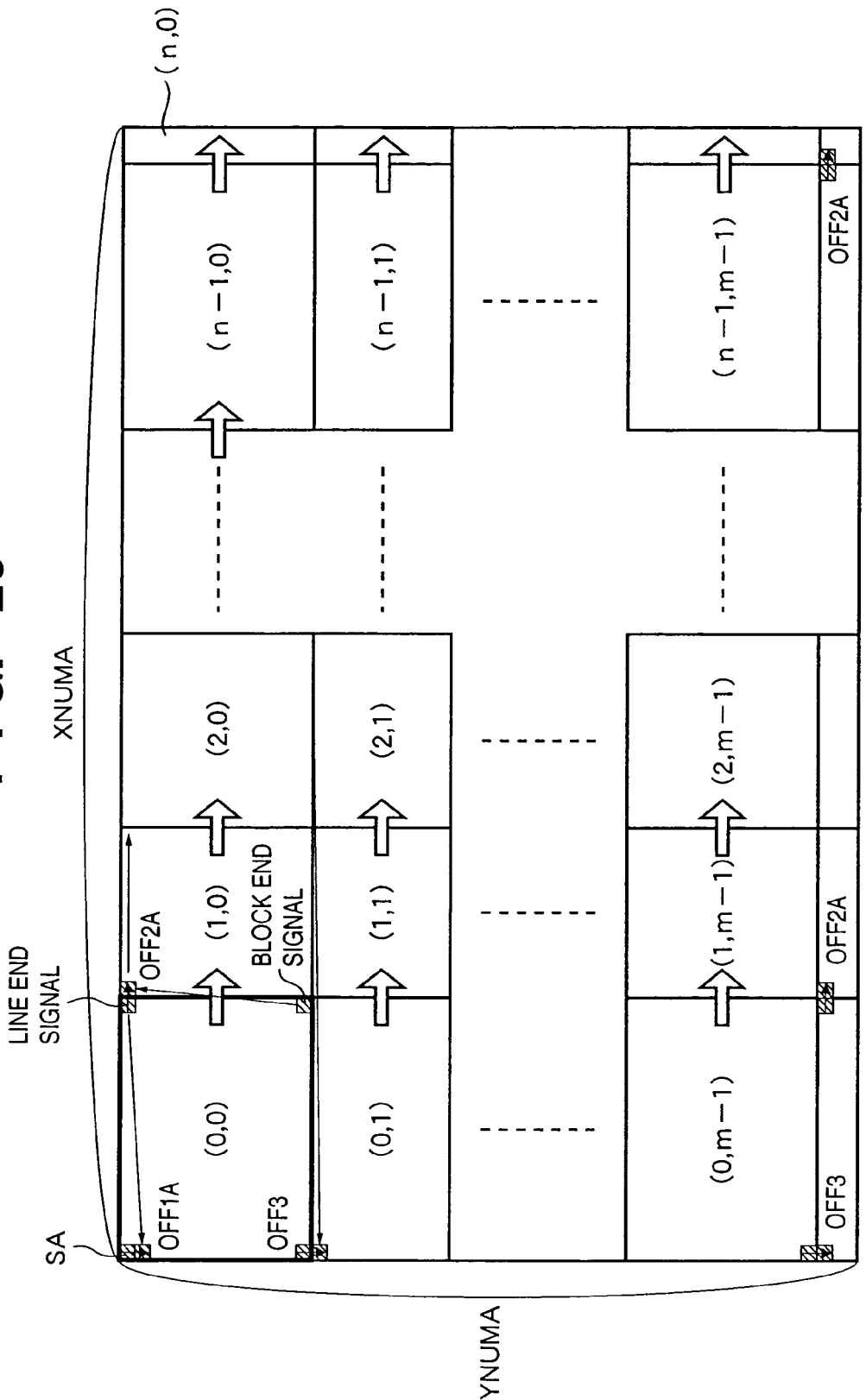

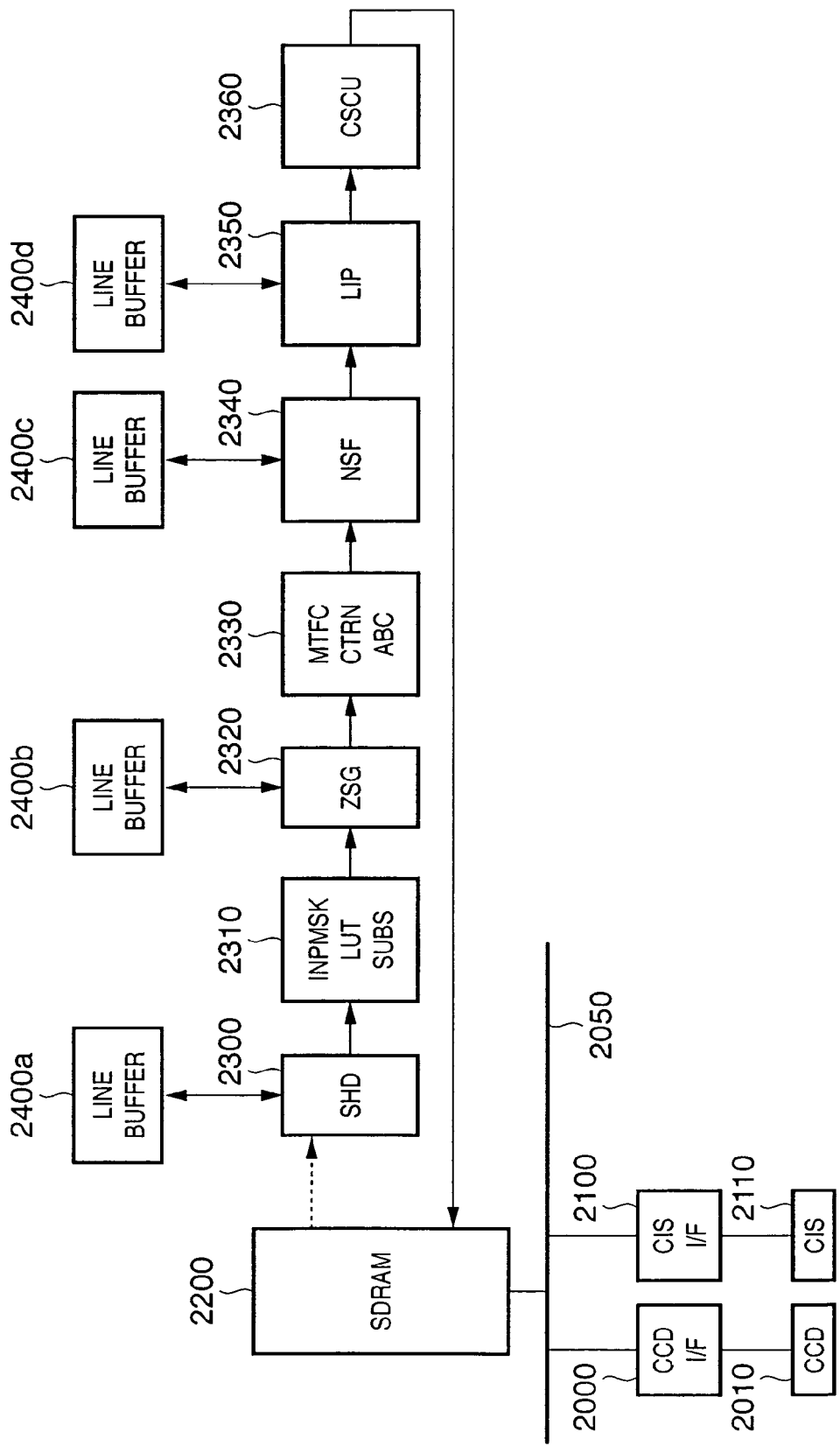

IMAGE PROCESSING APPARATUS AND IMAGE PROCESSING METHOD

FIELD OF THE INVENTION

The present invention relates to an image processing technique which is compatible with both an image reading device (CCD (Charged Coupled Device)) and a CIS (Contact Image Sensor) and controls storage of image data read by each device in a memory and a read of the stored data for each rectangular area.

BACKGROUND OF THE INVENTION

FIG. 27 is a block diagram showing the composition of a scanner image processing circuit in a conventional image processing apparatus. As an image reading device, an optical element such as a CCD 2010 or CIS 2110 is used. Data according to a predetermined output format is A/D-converted by a CCD interface (I/F) circuit 2000 or CIS interface (I/F) circuit 2100 and stored in a main memory 2200 for each line in the main scanning direction. In this case, the CCD 2010 outputs data corresponding to R, G, and B in parallel. The CIS 2110 serially outputs the signals of R, G, and B data in accordance with the order of LED lighting. Depending on different output data characteristics, the CCD and CIS have dedicated interface circuits. After predetermined A/D conversion processing, the read image data is stored in the main memory (SDRAM) 2200.

Referring to FIG. 27, image processing blocks (shading correction (SHD) 2300, character determination processing 2320, filter processing 2340, and the like) have dedicated line buffers 2400a to 2400d. In this circuit composition, data corresponding to a plurality of lines, which are stored in the main memory (SDRAM) 2200, are read out in the main scanning direction, stored in the dedicated line buffers (2400a to 2400d), and subjected to individual image processing operations.

However, in the circuit composition that prepares dedicated line buffers 2400a to 2400d for the respective processing sections, the maximum number of pixels that can be processed in the main scanning direction depends on the memory capacity of the dedicated line buffer of each processing section. This restricts the throughput of processing.

If the capacity of the line buffer is increased in the hardware configuration of the image processing circuit to improve the processing capability, the cost increases. This impedes cost reduction of the entire image processing apparatus.

A signal output from the CCD 2010 or CIS 2110 serving as an image reading device is processed by the dedicated interface circuit (2000 or 2100) in accordance with the output format. Bitmapping of read image data on the main memory 2200 depends on which device (e.g., the CCD or CIS) has been used, and image data input processing must inevitably be specialized. That is, the image processing circuit is customized depending on the employed image reading device. This impedes generalization and cost reduction of the image processing circuit.

A prior art having the above composition is disclosed in, e.g., Japanese Patent Laid-Open No. 7-170372.

SUMMARY OF THE INVENTION

The present invention has been proposed to solve the above problems, and has as its object to provide an image processing apparatus which is compatible with various image reading devices such as a CCD and CIS. It is another object of the present invention to provide an image processing apparatus which controls data processing, including storage of image data read by each image reading device in a memory and processing by an image processing section, by extracting data in a main memory as a predetermined unit appropriate for each image processing mode without intervention of individual line buffers.

In order to achieve the above objects, an image processing apparatus according to the present invention is characterized by mainly comprising:

input means for executing input processing of image data read by an image reading device in accordance with a data output format of the device;

output data control means for distributing the image data that has undergone the input processing by the input means, in accordance with the output format of the image reading device;

address generation means for generating address information corresponding to the output format to store the distributed image data in a memory; and memory control means for DMA-transferring the distributed image data to the memory and storing the image data on the basis of the generated address information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing the schematic composition of a scanner I/F section 10;

FIG. 5A is a timing chart showing the relationship between an output (51e) and the ON states (51b to 51d) of LEDs corresponding to R, G, and B according to the timing chart shown in FIG. 4;

FIG. 6 is a block diagram for explaining processing of an AFE 15;

FIGS. 8A and 8B are views for explaining processing for causing an LDMAC_A 105a to write 1-channel data in a main memory 100;

FIGS. 9A and 9B are views for explaining processing for causing the LDMAC_A 105a to write data of two channels in the main memory 100;

FIG. 16 is a block diagram for explaining the schematic composition of the scanner image processing section 20;

FIGS. 18A and 18B are views showing overlap widths in the respective image processing modes (color copy mode, monochrome copy mode, and scanner mode);

FIGS. 19A to 19D are views schematically showing the sizes of rectangular areas necessary for the respective image processing modes;

FIG. 26 is a view for explaining a state in which data is bitmapped on the main memory 100 in accordance with a line end signal and block end signal; and FIG. 27 is a block diagram showing the composition of a scanner image processing circuit in a conventional image processing apparatus.

DETAILED DESCRIPTION OF THE PREFERRED EMBODIMENT

A preferred embodiment of the present invention will now be described in detail in accordance with the accompanying drawings.

Figure 1:
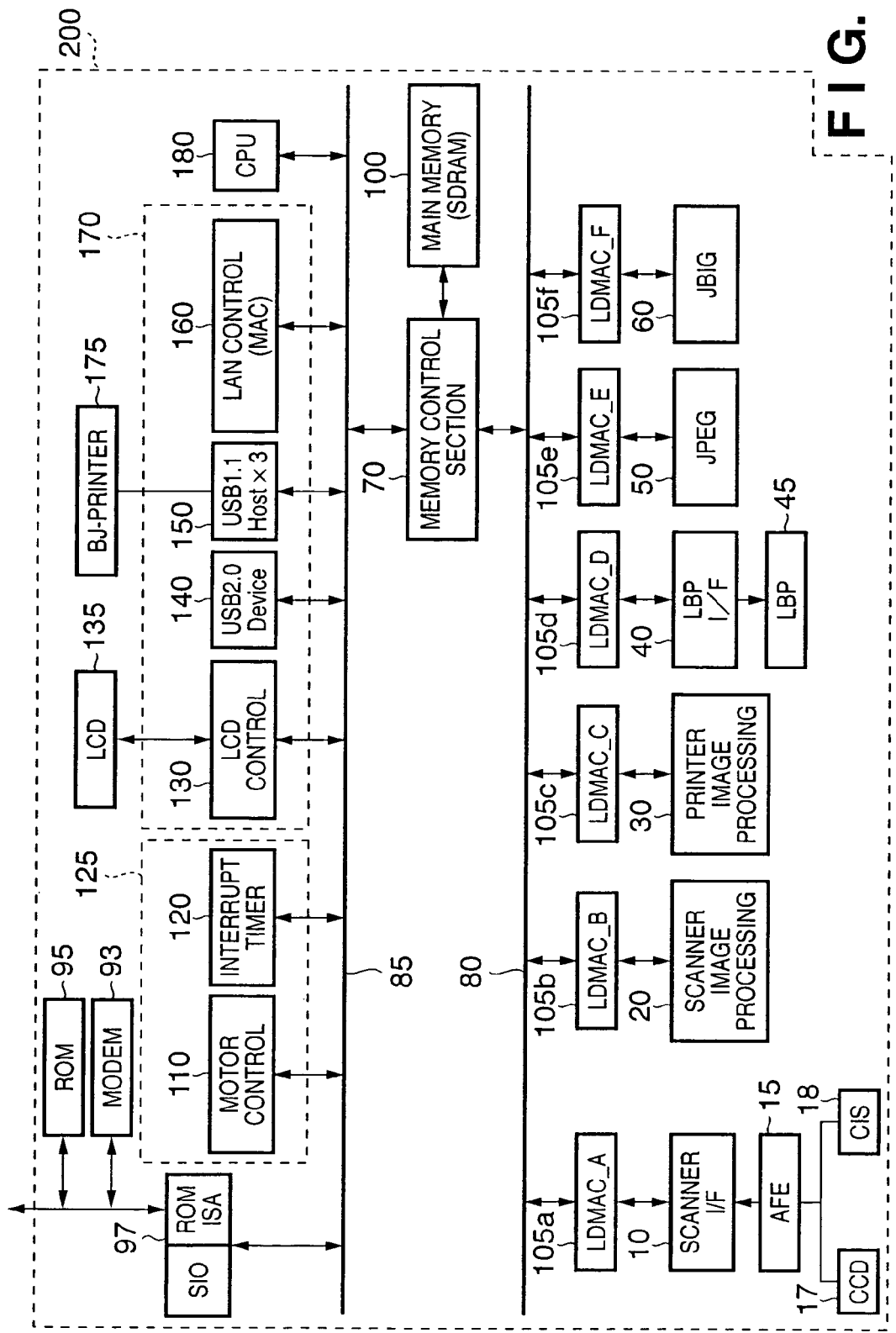
FIG. 1 is a block diagram showing the schematic composition of an image processing apparatus 200 according to an embodiment of the present invention.

FIG. 1 is a block diagram showing the schematic composition of an image processing apparatus 200 according to an embodiment of the present invention. A CCD 17 and CIS 18 are connected to a scanner interface (to be referred to as a "scanner I/F" hereinafter) section 10 through an analog front end (AFE) 15. Read data can be input to the image processing apparatus 200 without intervening individual dedicated circuits. Data processing by the scanner I/F section 10 will be described later in detail.

A scanner image processing section 20 executes image processing corresponding to an image processing operation mode (color copy, monochrome copy, color scan, monochrome scan, and the like) for image data that is bitmapped on a main memory 100 by processing of the scanner I/F section 10. The scanner image processing section 20 will be described later in detail.

A printer image processing section 30 is a processing unit to printer-output image data obtained by image processing. The printer image processing section 30 executes processing for outputting an image processing result to a laser beam printer (LBP) 45 which is connected through an LBP interface (I/F) 40.

A JPEG module 50 and JBIG module 60 are processing sections which execute compression and expansion processing of image data on the basis of predetermined standards.

A memory control section 70 is connected to a first BUS 80 of the image processing system and a second BUS 85 of the computer system. The memory control section 70 systematically controls processing units (LDMAC_A to LDMAC_F (105a to 105f)) which execute DMA control related to a data write and read for the main memory (SDRAM) 100. "DMA (Direct Memory Access)" means processing for directly moving data between the main storage device and the peripheral devices.

The processing units (LDMAC_A to LDMAC_F (105a to 105f)) which execute DMA control of image data are connected between the first BUS 80 and the above-described scanner I/F section 10, scanner image processing section 20, printer image processing section 30, LBP I/F section 40, JPEG processing section 50, and JBIG processing section 60 in correspondence with the respective processing sections (10 to 60).

In association with data transmission/reception between the respective image processing sections (10 to 60) and the main memory 100, the LDMAC_A to LDMAC_F (105a to 105f) generate predetermined address information to execute DMA control and controls DMA on the basis of the information. For example, the LDMAC_A 105a generates, for each DMA channel, address information (e.g., a start address to start DMA or offset information to switch the address of the memory) to DMA-transfer image data read by the scanner I/F section 10 to the main memory 100. The LDMAC_B (105b) generates, in accordance with a DMA channel, address information to read out image data bitmapped on the main memory 100.

The LDMAC_C to LDMAC_F (105c to 105f) can also generate predetermined address information and, on the basis of the information, execute DMA control related to data transmission/reception to/from the main memory 100. More specifically, the LDMAC_C to LDMAC_F (105c to 105f) have channels corresponding to the data write and read and generate address information corresponding to the channels to control DMA.

The first BUS 80 allows data transmission/reception between the processing sections (10 to 60) of the image processing system. The second BUS 85 of the computer system is connected to a CPU 180, communication & user interface control section 170, mechatronics system control section 125, and ROM 95. The CPU 180 can control the above-described LDMAC_A to LDMAC_F (105a to 105f) on the basis of control parameters or control program stored in the ROM 95.

The mechatronics system control section 125 includes a motor control section 110 and an interrupt timer control section 120 which executes timing control to control the motor drive timings or synchronization of processing of the image processing system.

An LCD control section 130 is a unit which executes display control to display various settings or processing situations of the image processing apparatus on an LCD 135.

USB interface sections 140 and 150 enable connection to the peripheral devices. FIG. 1 shows a state in which a BJ-printer 175 is connected.

A media access control (MAC) section 160 is a unit which controls data transmission (access) timings to a connected device.

The CPU 180 controls the entire operation of the image processing apparatus 200.

<Composition of Scanner I/F Section 10>

The scanner I/F section 10 is compatible with the CCD 17 and CIS 18 serving as image reading devices. The scanner I/F section 10 executes input processing of signals from these image reading devices. The input image data is DMA-transferred by the LDMAC_A (105*a*) and bitmapped on the main memory 100.

FIG. 2 is a block diagram showing the schematic composition of the scanner I/F section 10. A timing control section 11*a* generates a read device control signal corresponding to the read speed and outputs the control signal to the CCD 17/CIS 18. The device control signal synchronizes with a sync signal generated by the scanner I/F section 10 so that the read timing in the main scanning direction and read processing can be synchronized.

Figures 3A, 3B, 3C, 3D:
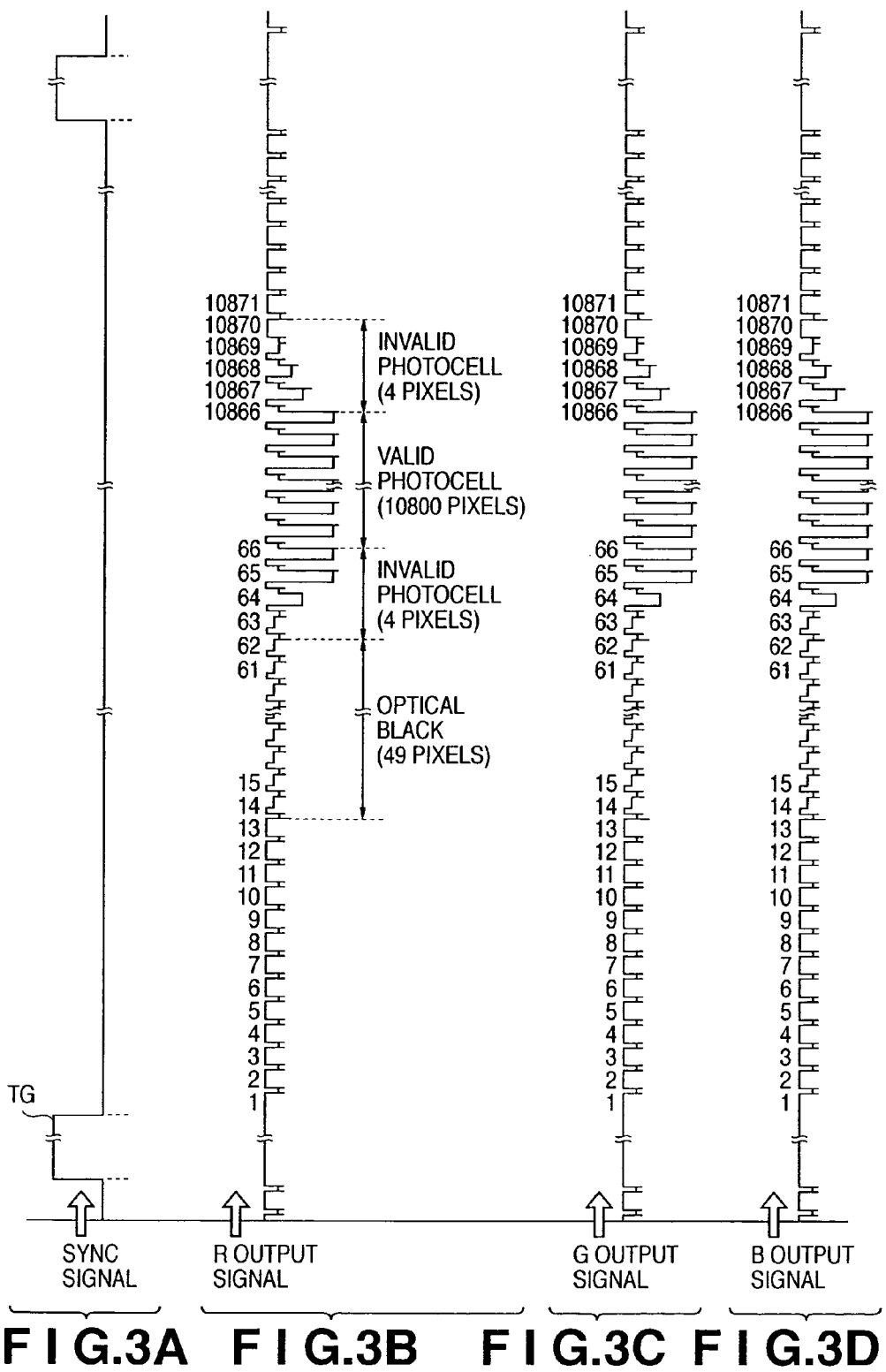
FIGS. 3A to 3D are views showing output signals by a CCD 17.
Figure 4:
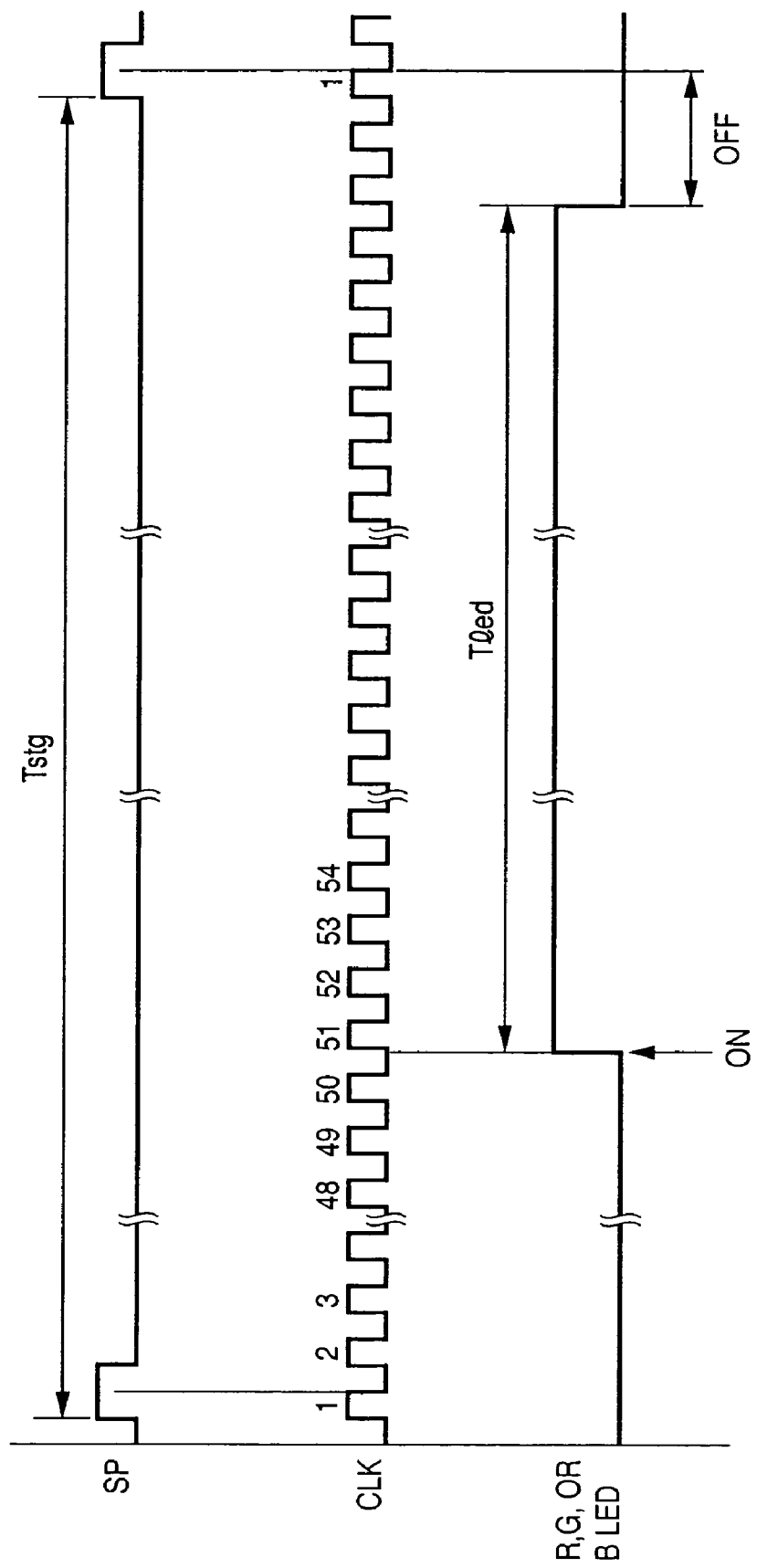
FIG. 4 is a timing chart related to lighting control of an LED 19 for a CIS 18.

An LED lighting control section 11*b* is a unit which controls lighting of an LED 19 serving as a light source for the CCD 17/CIS 18. The LED lighting control section 11*b* controls sync signals (TG and SP; FIGS. 3A and 4) for sequential lighting control of LEDs corresponding to R, G, and B color components, a clock signal (CLK; FIG. 4), and brightness control suitable for the CCD 17/CIS 18 and also controls the start/end of lighting. The control timing is based on a sync signal received from the above-described timing control section. Lighting of the LED 19 is controlled in synchronism with drive of the image reading device.

FIGS. 3A to 3D are views showing output signals by the CCD 17. An original surface is irradiated with light emitted from the LED 19. Reflected light is guided to the CCD 17 and photoelectrically converted. For example, the original surface is sequentially scanned for each line in the main scanning direction while moving the read position at a constant speed in a direction (sub-scanning direction) perpendicular to the line direction, i.e., the main scanning direction of the CCD 17. Accordingly, the image on the entire original surface can be read. As shown in FIG. 3A, on the basis of the sync signal (TG) output from the timing control section 11*a*, signals corresponding to the R, G, and B elements of one line of the CCD 17 are output in parallel (FIGS. 3B, 3C, and 3D).

FIG. 4 is a timing chart related to lighting control of the LED 19 for the CIS 18. On the basis of the sync signal (SP) and clock signal (CLK) generated by the LED lighting control section 11*b*, the lighting start and end timings of the R, G, and B LEDs are controlled. The period of the sync signal (SP) is represented by Tstg. Within this time, lighting of one of the LEDs (R, G, and B) or a combination thereof is controlled. Tled indicates the LED ON time during one period (Tstg) of the sync signal (SP).

FIG. 5A is a timing chart showing ON states (51*a* to 51*d*) of the LEDs corresponding to R, G, and B and an output 51*e* obtained by photoelectrically converting LED reflected light accumulated in the ON time in accordance with the timing chart shown in FIG. 4 described above. As is apparent from 51*e* in FIG. 5A, the R output, G output, and B output corresponding to the R, G, and B colors are output as serial data. It is different from the output signals of the CCD 17 described above.

Figure 5B:
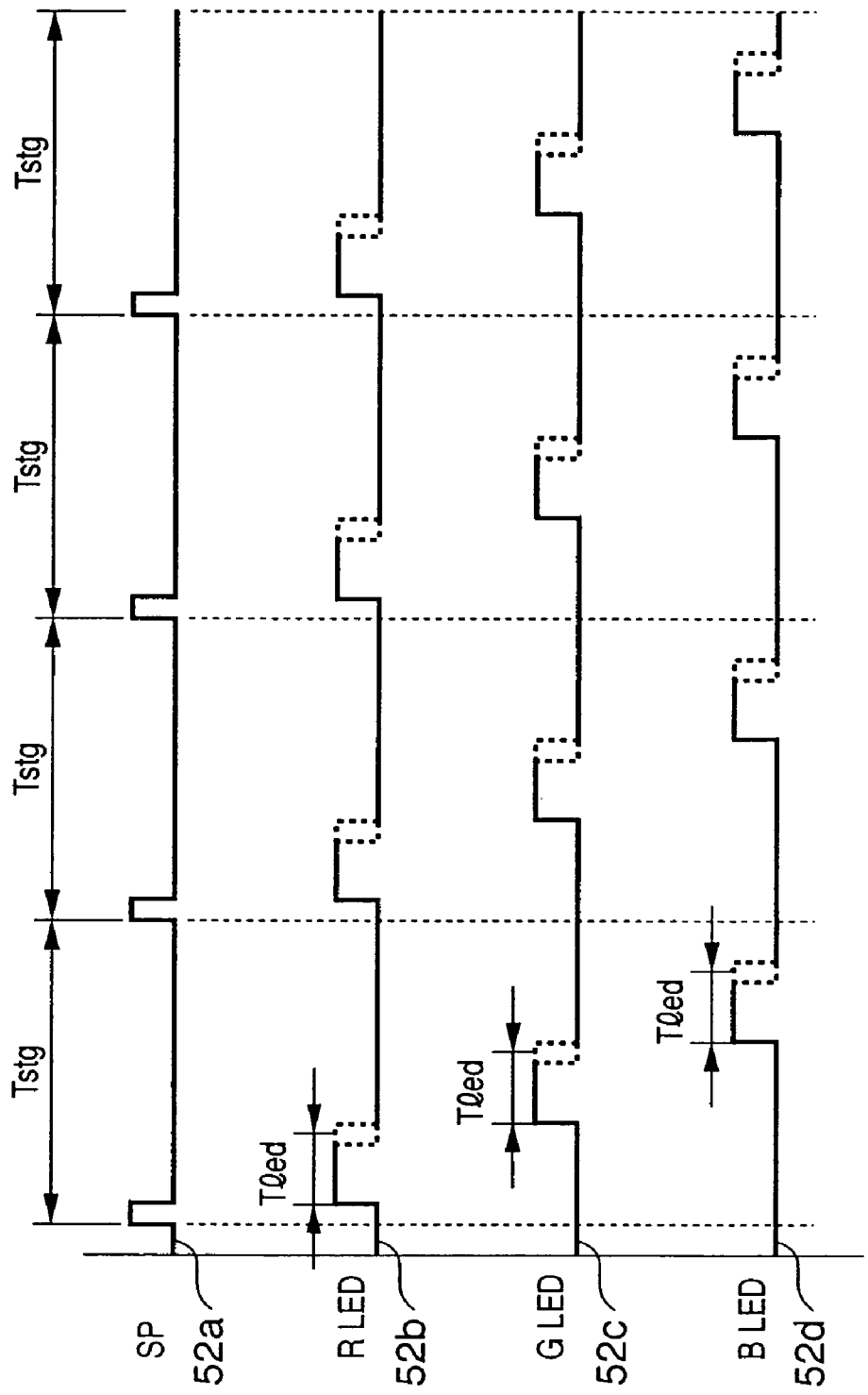
FIG. 5B is a timing chart showing timings when the R, G, and B LEDs 19 are sequentially turned on within one period of a sync signal (SP) in association with control of the CIS 18.

FIG. 5B is a timing chart showing timings when the R, G, and B LEDs 19 are sequentially turned on within one period of the sync signal (SP) in association with control of the CIS 18. In this case, when the R, G, and B data are synthesized, the input from the image reading device can be input to the image processing apparatus 200 as monochrome image data.

Figure 5C:
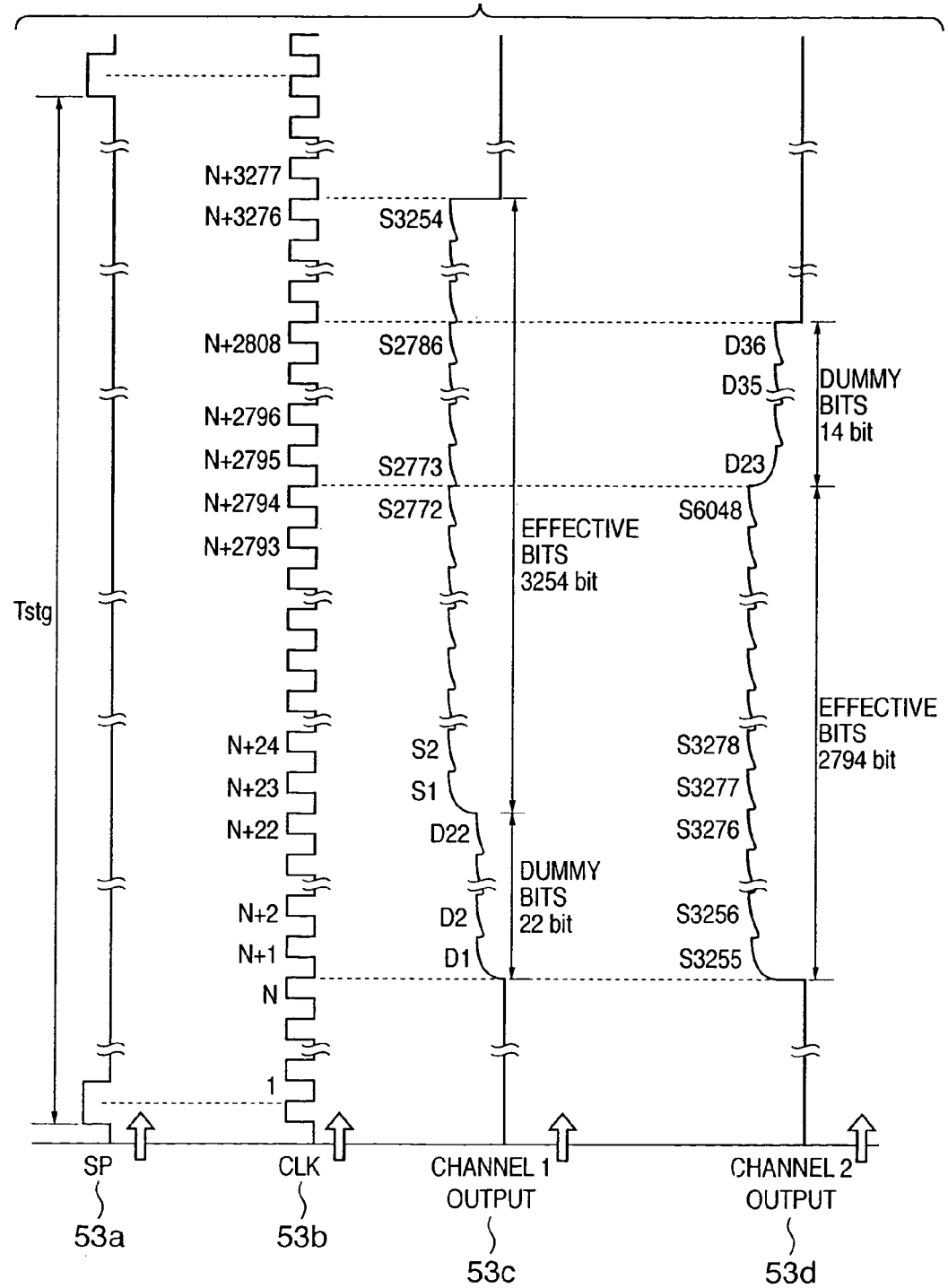
FIG. 5C is a view showing outputs when two channels of a CIS 18 are arranged in the main scanning direction.

FIG. 5C is a view showing outputs when two channels of the CIS 18 are arranged in the main scanning direction. Channel 1 (53*c* in FIG. 5C) outputs an arbitrary dummy bitstream in synchronism with the trailing edge of an Nth CLK signal (53*b* in FIG. 5C) and then outputs a signal corresponding to 3,254 effective bits (53*c* in FIG. 5C). On the other hand, channel 2 (53*d* in FIG. 5C) outputs 2,794 bits as effective bits from the 3,255th effective bit (the bit that follows the last 3,254th bit of the sensor output of channel 1) in synchronism with the trailing edge of the Nth CLK signal.

With the sensor outputs of two channels, data corresponding to one line in the main scanning direction can be segmented and read. The maximum number of channels of the CIS is not limited to two. Even when, e.g., a 3-channel structure is employed, the scope of the present invention is not limited, and only the number of effective bit outputs changes.

Referring back to FIG. 2, the output signal from the image reading device (CCD 17/CIS 18) is input to the AFE (Analog Front End) 15. As shown in FIG. 6, the AFE 15 executes gain adjustment (15*a* and 15*d*) and A/D conversion processing (15*b*, 15*c*, and 15*e*) for the output signals from the CCD 17 and CIS 18. The AFE 15 converts the analog signal output from each image reading device into a digital signal and inputs the digital signal to the scanner I/F section 10. The AFE 15 can also convert parallel data output from each image reading device into serial data and output the serial data.

A sync control section 11*c* shown in FIG. 2 sets, for the AFE 15, a predetermined threshold level corresponding to the analog signal from each device (17 or 18) and adjusts the output signal level by the difference in image reading device. The sync control section 11*c* also generates and outputs a sync clock to execute sampling control of the analog signal to cause the AFE 15 to output a digital signal and receives read image data by a predetermined digital signal from the AFE 15. This data is input to an output data control section 11*d* through the sync control section 11*c*. The output data control section 11*d* stores the image data received from the AFE 15 in buffers (11*e*, 11*f*, and 11*g*) in accordance with the output mode of the scanner I/F section 10.

The output mode of the scanner I/F section 10 can be switched between a single mode, 2-channel (2-ch) mode, and 3-channel (3-ch) mode in accordance with the connected image reading device.

The single mode is selected when main-scanning data should be input from the AFE 15. In this case, only one buffer is usable.

The 2-ch mode is selected when data input from the AFE 15 should be input at the same timing as 2-channel information of the image reading device. In this case, two buffers (e.g., 11*e* and 11*f*) are set in the usable state.

The 3-ch mode is selected when image data received from the AFE 15 should be input at the same timing as R, G, and B outputs. In this case, three buffers (11*e*, 11*f*, and 11*g*) are set in the usable state.

When color image data is read by the CIS 18 in the single mode, data received from the AFE 15 contains R, G, and B data outputs which are serially sequenced in accordance with the lighting order of the LEDs, as indicated by 51*e* in FIG. 5A. The output data control section 11*d* stores the data in one buffer (e.g., the first buffer (11*e*)) in accordance with the sequence. This processing also applies to a case wherein monochrome image data is read by the CIS 18. The monochrome image data is stored in one buffer.

When color image data is read by the CIS 18 having two channels, the above-described 2-ch mode is set. Data received from the AFE 15 contains data for each of two regions divided in the main scanning direction, as indicated by 53*c* and 53*d* in FIG. 5C. To store the data in each region, the output data control section 11*d* stores the received data in two buffers (e.g., the first buffer (11*e*) and second buffer (11*f*)). This processing also applies to a case wherein monochrome image data is read by the CIS having two channels.

When color image data is read by the CCD 17, the output data control section 11*d* can separately store the data received from the AFE 15, which contains R, G, and B data, in three buffers (first, second, and third buffers (11*e*, 11*f*, and 11*g*)) in the above-described 3-ch mode.

Processing for causing the scanner I/F section 10 to DMA-transfer image data stored in a predetermined buffer (11*e*, 11*f*, or 11*g*) to the main memory (SDRAM) 100 and store the image data in the main memory will be described next. The processing for DMA-transferring image data to the main memory 100 and storing the data in the main memory is controlled by the LDMAC_A (105*a*).

Figure 7:
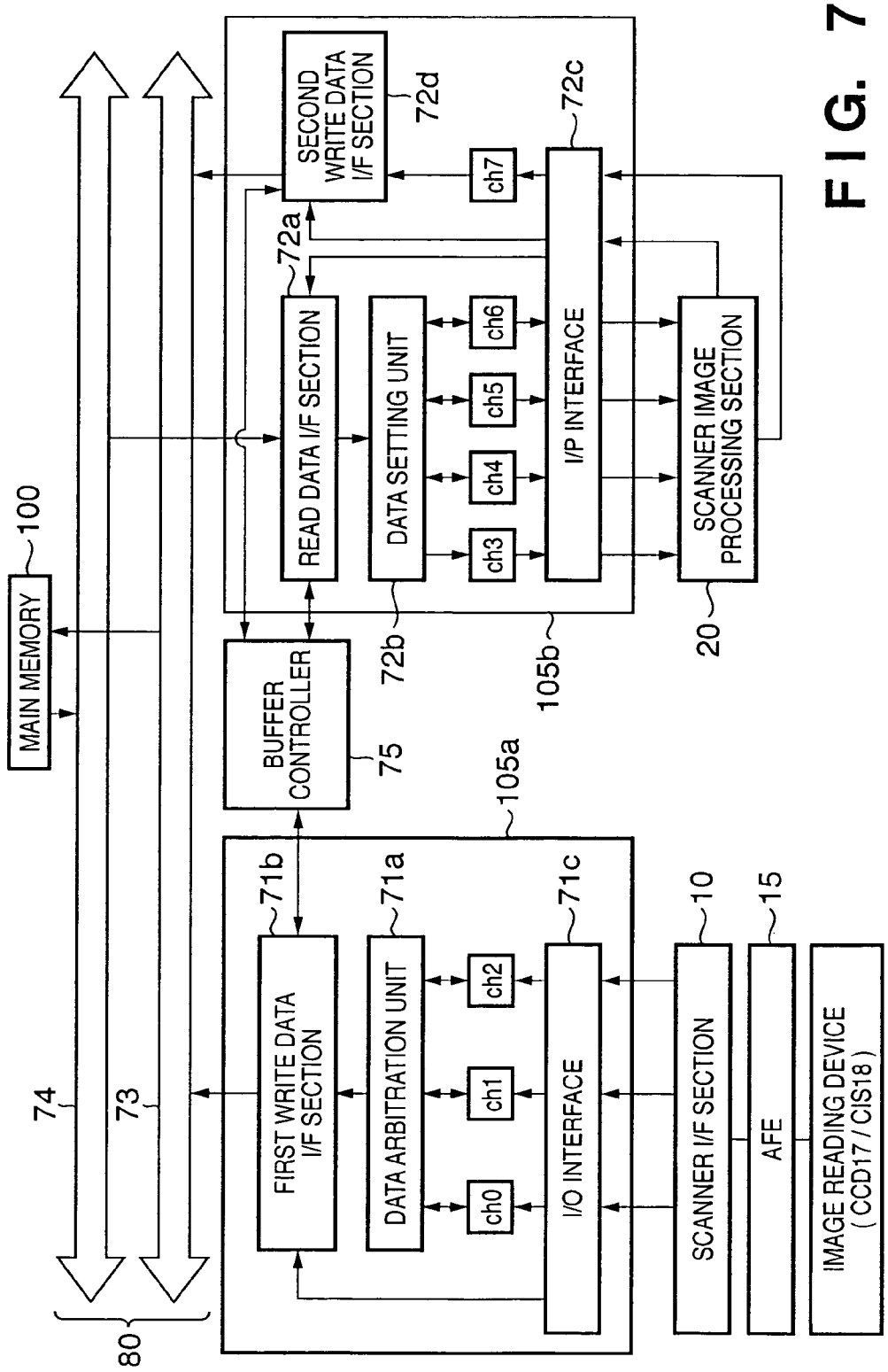
FIG. 7 is a block diagram showing the schematic composition of an LDMAC_A which DMA-transfers image data read by an image reading device to a main memory and an LDMAC_B which controls DMA between the main memory and the scanner image processing section.

FIG. 7 is a block diagram showing the schematic composition of the LDMAC_A (105*a*) which DMA-transfers image data read by the image reading device (17 to 18) to the main memory (SDRAM) 100 and the LDMAC_B (105*b*) which controls DMA between the main memory 100 and the scanner image processing section 20.

When the main memory 100 is to be used as a ring buffer, a buffer controller 75 controls the LDMAC_A (105*a*) and LDMAC_B (105*b*) to arbitrate the data write and read.

<Composition of LDMAC_A (105*a*)>

The LDMAC_A (105*a*) has a data arbitration unit 71*a*, first write data interface (I/F) section 71*b*, and I/O interface section 71*c*.

The I/O interface section 71*c* sets, in the first write data I/F section 71*b*, predetermined address information generated by the LDMAC_A to store data in the main memory 100. The I/O interface section 71*c* also receives image data from the scanner I/F section 10 and stores them in buffer channels (to be referred to as "channels" hereinafter) (ch0 to ch2) in the LDMAC_A (105*a*).

The first write data I/F section 71*b* is connected to a third BUS 73 to be used to write data in the main memory 100. The first write data I/F section 71*b* DMA-transfers data stored in the channels (ch0 to ch2) to the main memory 100 in accordance with the generated predetermined address information. The data arbitration unit 71*a* reads the data stored in each channel and transfers the data in each channel in accordance with the write processing of the first write data I/F section 71*b*.

The first write data I/F section 71*b* is connected to the buffer controller 75 and controlled such that memory access does not conflict with the data read or write by the LDMAC_B (105*b*) (to be described later). With access control for the main memory 100, even when the main memory 100 is used as a ring buffer, data is never overwritten at the same memory address before the read of data stored in the main memory 100. Hence, the memory resource can be effectively used.

<(1) Storage of 1-Channel Data>

FIGS. 8A and 8B are views for explaining processing for causing the LDMAC_A 105*a* to write 1-channel data in the main memory (SDRAM) 100. As in the output example indicated by 51*e* in FIG. 5A, when R, G, and B data corresponding to one line in the main scanning direction are serially output and stored in one buffer (11(*e*) in FIG. 2) of the scanner I/F section 10, the data are transferred to one corresponding channel (ch0; FIG. 7) in the LDMAC_A (105*a*). Referring to FIGS. 8A, 8B, 9A, 9B, and 10, a composition which causes the data arbitration unit 71*a* and first write data I/F section 71*b* to DMA-transfer data of channel (ch0) and store it in the main memory 100 will be referred as "first LDMAC". A composition which processes data of channel (ch1) will be referred to as "second LDMAC". A composition which processes data of channel (ch2) will be referred to as "third LDMAC".

FIG. 8A is a view showing processing for separating 1-channel color image data into R, G, and B data and storing them. The first LDMAC writes, of the R, G, and B in the line order, R data corresponding to one line (R1 to R2) in the main scanning direction in an R area (1000*a*) of the main memory 100 and switches the write address to a start address (G1) of a G area (1000*b*) as the next write area. The first LDMAC writes, of the R, G, and B, G data corresponding to one line (G1 to G2) in the main scanning direction in the G area (1000*b*) of the main memory 100 and switches the write address to a start address (B1) of a B area (1000*c*) as the next write area. The first LDMAC writes B data corresponding to one line (B1 to B2) in the main scanning direction in the B area (1000*c*) of the main memory 100 and switches the address to the start address (R2) of the second line of the R area (1000*a*). For the G and B data as well, the data write address is shifted to the second line in the sub-scanning direction, and the data are written.

In DMA control for the data write by the first LDMAC, the memory address as the storage destination of data corresponding to each of the R, G, and B data is given as offset information (A or B), and the storage area for each color data is switched. With this composition, the R, G, and B data in the line order can be separated and stored in the main memory 100 as R data, G data, and B data.

The start address (R1 in FIG. 8A) at which DMA transfer is started and offset information (A and B) are generated by the LDMAC_A (105*a*) described above.

FIG. 8B is a view for explaining write processing of monochrome image data by the CIS 18, which is obtained at the LED lighting timing shown in FIG. 5B. Monochrome image data need not be separated into R, G, and B data. For the monochrome image data in the line order, data corresponding to one line (M1 to M2) is written in the main scanning direction of the main memory 100. The write address is shifted in the sub-scanning direction of an area (1000*d*), and the next data corresponding to the second line (M3 to M4) is written. By sequentially executing this processing, the monochrome image data can be stored in the area (1000*d*) of the main memory.

<(2) Storage of 2-Channel Data by CIS>

FIG. 9A is a view showing processing for separating 2-channel color image data into R, G, and B data and storing them, as shown in FIG. 5C. The memory area in the main scanning direction is divided in correspondence with the two channels.

Image data read by the CIS 18 having two channels (chip0 and chip1) are stored in two buffers (11*e* and 11*f*) of the scanner I/F section 10. The data in the two buffers (11e and 11f) are transferred to the channels (ch0 and ch1) in the LDMAC_A 105a under the control by the LDMAC_A 105a.

The first LDMAC stores the data (chip0_data) of channel (ch0) in areas indicated by a first R area (1100a), first G area (1200a), and first B area (1300a) in FIG. 9A.

Referring to FIG. 9A, the first LDMAC writes, of the R, G, and B input from chip0, R data (RA1 to RA2) in the first R area (1100a) of the main memory and switches the write address to a start address (GA1) of the first G area (1200a) as the next write area (offset information C). The first LDMAC writes, of the R, G, and B data, G data (GA1 to GA2) in the first G area (1200a) of the main memory and switches the write address to a start address (BA1) of the first B area (1300a) as the next write area (offset information C). The first LDMAC writes, of the R, G, and B data, B data (BA1 to BA2) in the B area (1300a) of the main memory, and after the end of processing, switches the address to a start address (RA3) of the second line in the sub-scanning direction of the R area (1100a) (offset information D). For the G and B data as well, the data write address is shifted to the second line in the sub-scanning direction, and the data are written.

On the basis of the offset information (C or D), the first LDMAC can arbitrarily set a memory address as data storage destination for each of the first R area (1100a), first G area (1200a), and first B area (1300a) in FIG. 9A as the data storage area of the main memory. The data stored in the channel (ch0) is stored in the main memory 100 in accordance with the settings.

The second LDMAC stores the data (chip1_data) of channel (ch1) in areas indicated by a second R area (1100b), second G area (1200b), and second B area (1300b) in FIG. 9A.

Referring to FIG. 9A, the second LDMAC writes, of the R, G, and B input from chip1, R data (RB1 to RB2) in the second R area (1100b) of the main memory and switches the write address to a start address (GB1) of the second G area (1200b) as the next write area (offset information E). The second LDMAC writes, of the R, G, and B data, G data (GB1 to GB2) in the second G area (1200b) of the main memory 100 and switches the write address to a start address (BB1) of the second B area (1300b) as the next write area (offset information E). The second LDMAC writes, of the R, G, and B data, B data (BB1 to BB2) in the second B area (1300b) of the main memory 100, and after the end of processing, switches the address to a start address (RB3) of the second line in the sub-scanning direction of the second R area (1100b) (offset information F). For the G and B data as well, the data write address is shifted to the second line in the sub-scanning direction, and the data are written.

In DMA control for the data write by the first and second LDMACs, the memory address as the storage destination of data corresponding to each of the R, G, and B data is given as offset information (C, D, E, or F), and the storage area for each color data is switched. With this composition, the R, G, and B data in the line order can be separated and stored in the main memory 100 as R data, G data, and B data.

The start addresses (RA1 and RB1 in FIG. 8A) at which DMA transfer is started and offset information (C, D, E, and F) are generated by the LDMAC_A (105a) described above.

FIG. 9B is a view for explaining write processing of monochrome image data by the CIS having two channels, which is obtained at the LED lighting timing shown in FIG. 5B. Monochrome image data need not be separated into R, G, and B data, unlike the above-described color image data. For the monochrome image data in the line order, data corresponding to one line (MA1 to MA2 or MB1 to MB2) is written in the main scanning direction of the main memory 100. The write address is shifted in the sub-scanning direction of an area (1400a or 1400b), and the next data corresponding to the second line (MA3 to MA4 or MB3 to MB4) is written. By sequentially executing this processing, the monochrome image data can be stored in the areas (1400a and 1400b) of the main memory.

<(3) Storage of 3-Channel Data>

Figure 10:
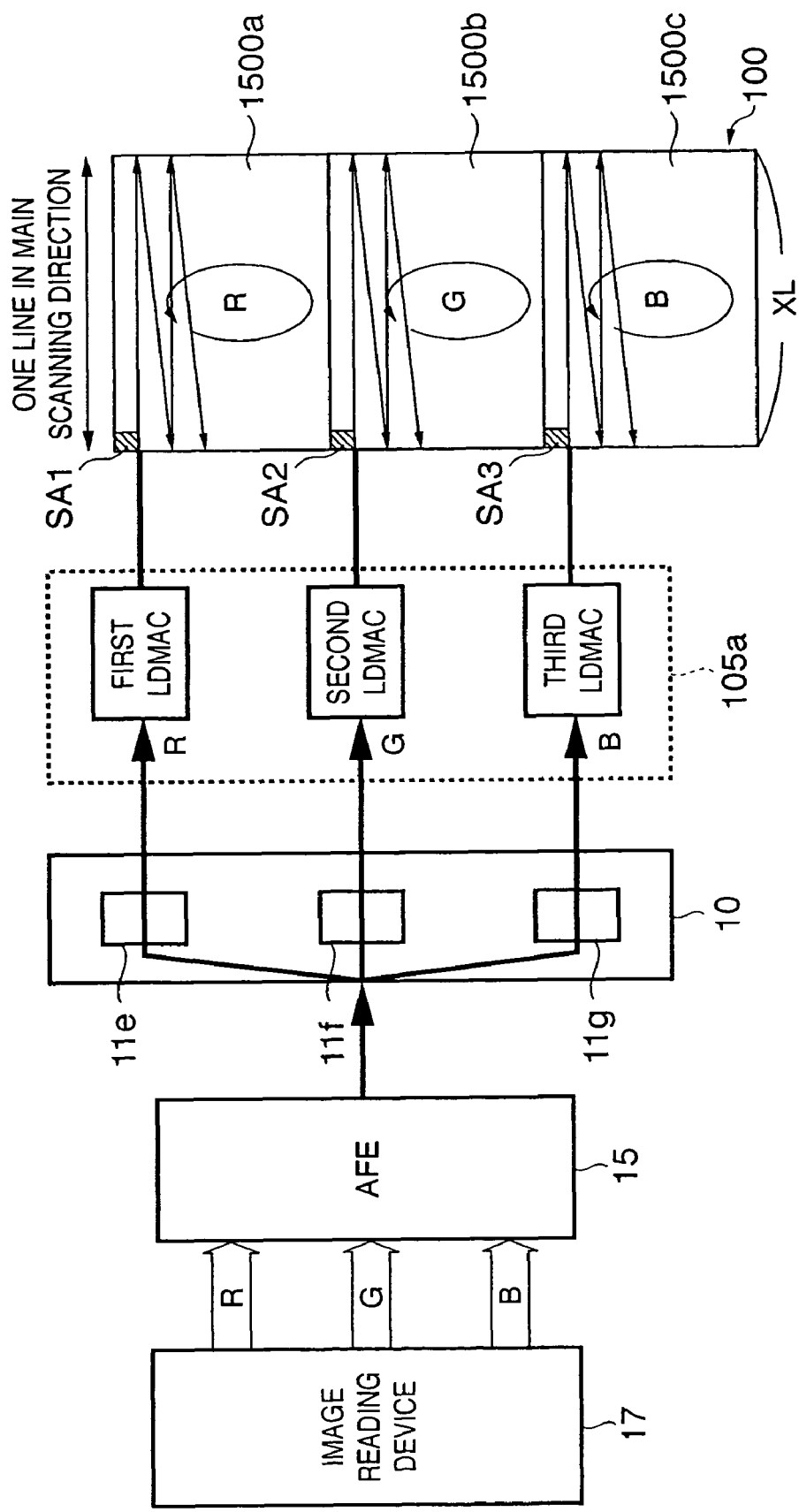
FIG. 10 is a view for explaining processing for causing the LDMAC_A 105a to write data of three channels in the main memory 100.

FIG. 10 is a view for explaining processing in which when the output data control section 11d of the scanner I/F section 10 processes image data read by the CCD 17 as 3-channel data (R data, G data, and B data), the first to third LDMACs corresponding to the respective channels write data in the main memory 100.

Data stored in three buffers (11e, 11f, and 11g in FIG. 2) are transferred to channels (ch0, ch1, and ch2) in the LDMAC_A 105a under the control of the LDMAC_A (105a). The data transferred to ch0 is written in the main memory 100 by the first LDMAC. The data transferred to ch1 is written in the main memory 100 by the second LDMAC. The data transferred to ch2 is written in the main memory 100 by the third LDMAC. The first to third LDMACs write the data in areas corresponding to an R area (1500a), G area (1500b), and B area (1500c) of the main memory 100 so that the R, G, and B data can be separately stored on the main memory 100.

In this case, the start addresses (SA1, SA2, and SA3 in FIG. 10) at which DMA transfer is started and are generated by the LDMAC_A (105a) described above.

As described above, image data read by the image reading device (CCD 17 or CIS 18) is distributed to channels that control DMA transfer in accordance with the output format. Address information and offset information, which control DMA for the distributed data, are generated. With this composition, the image processing apparatus can be compatible with various image reading devices.

In this embodiment, R, G, and B data are separated, and the image data are stored on the main memory 100 independently of the output format of the image reading device (CCD 17 or CIS 18). For this reason, DMA transfer corresponding to the output format of the image reading device (CCD 17 or CIS 18) need not be executed for the image processing section (to be described later) on the output side. Only DMA transfer corresponding to necessary image processing needs to be executed. Hence, an image processing apparatus that can be compatible with the output format of the image reading device (CCD 17 or CIS 18) with a very simple arrangement and control can be provided.

<Area Setting on Main Memory and DMA Transfer>

Figure 11A:
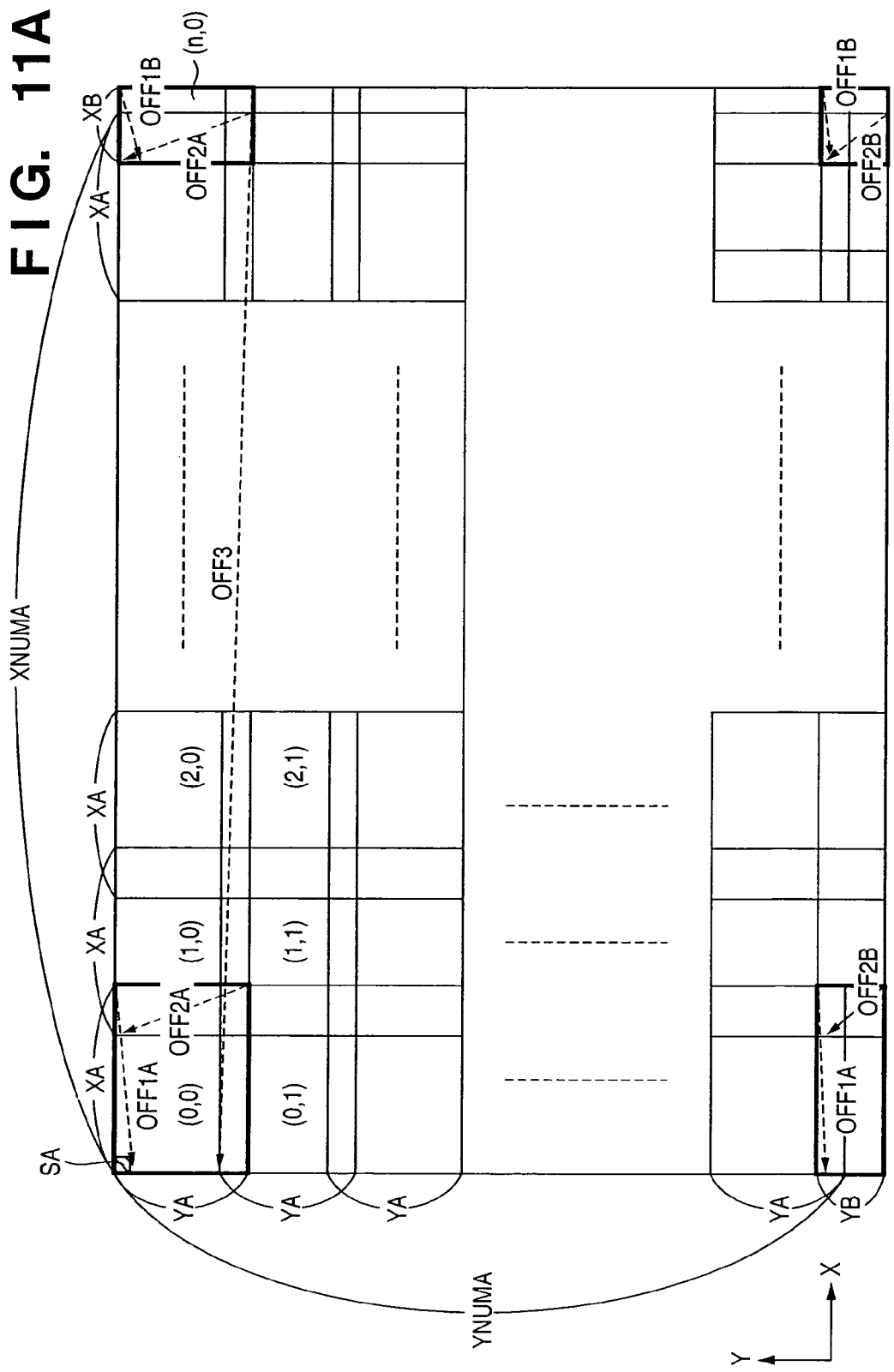
FIGS. 11A and 11B are views showing a state in which the main memory 100 is divided into predetermined rectangular areas (blocks)
Figure 11B:
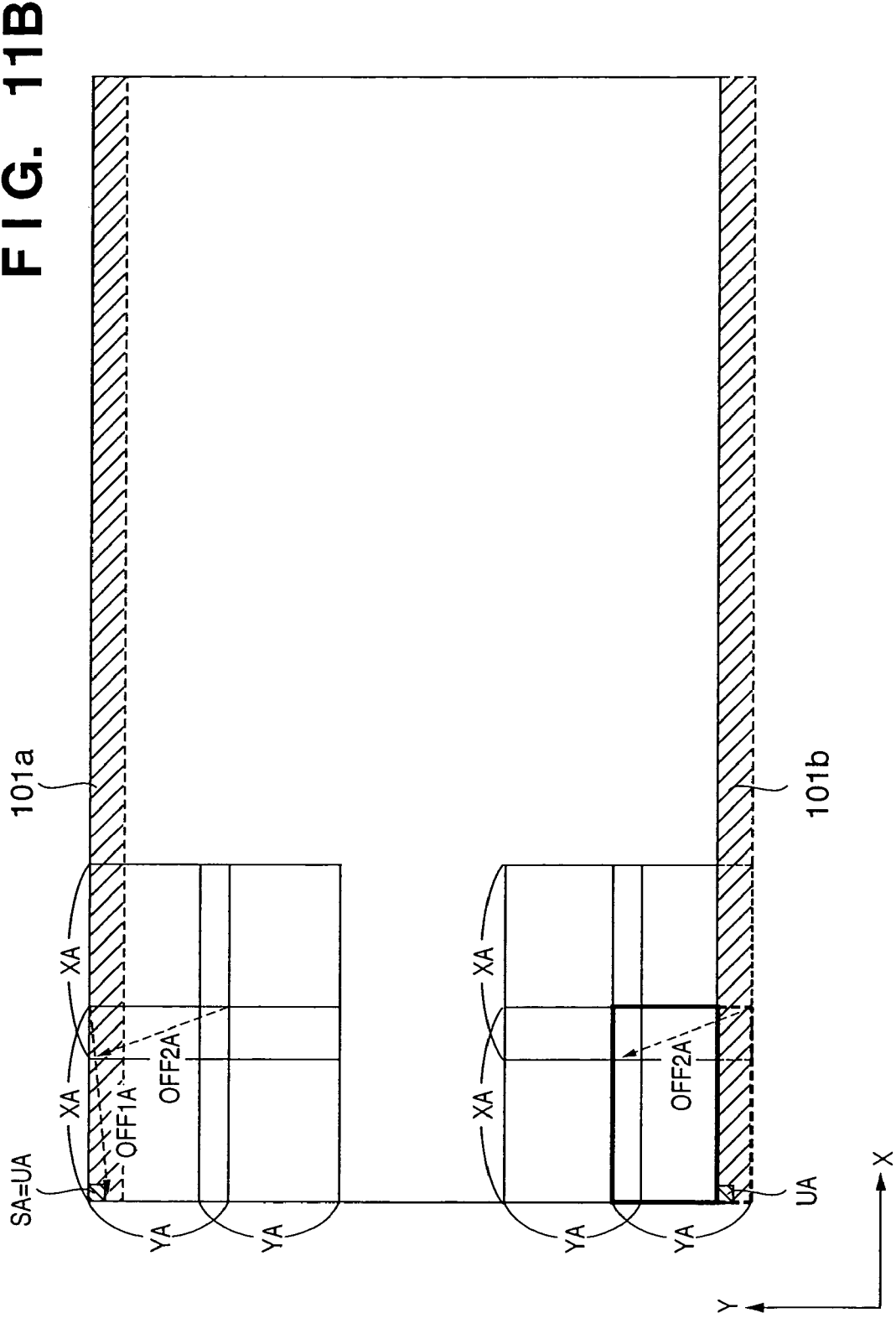

To DMA-transfer image data to the main memory 100, the LDMAC_A (105a) generates address information for the main memory 100 and controls DMA transfer in accordance with the address information. FIG. 11A is a view showing a state in which the main memory 100 is divided into predetermined rectangular areas (blocks). FIG. 11B is a view showing a case wherein the main memory 100 is used as a ring buffer. To process the image data stored in the main memory 100 for each rectangular area, address information to define a rectangular area is set in accordance with the image processing mode (copy mode or scanner mode). Referring to FIG. 11A, SA indicates the start address of DMA. An area in the main scanning direction (X-axis direction) is divided by a predetermined byte length (XA or XB). An area in the sub-scanning direction (Y-axis direction) is divided by a predetermined number of lines (YA or YB). When the main memory 100 is used as a ring buffer (FIG. 11B), hatched areas 101a and 101b are the same memory area.

DMA for a rectangular area (0,0) starts from the start address SA. When data corresponding to XA in the main scanning direction is transferred, an address represented by offset data (OFF1A) is set as a transfer address shifted in the sub-scanning direction by one line. In a similar manner, transfer in the main scanning direction and address shift by offset data (OFF1A) are controlled. When DMA for the rectangular area (0,0) is ended, processing advances to DMA for the next rectangular area (1,0).

In DMA for the rectangular area (1,0), the address jumps to an address represented by an offset address (OFF2A). Transfer in the main scanning direction and address shift by offset data (OFF1A) are controlled, as in the rectangular area (0,0). When DMA for the rectangular area (1,0) is ended, processing advances to the next rectangular area (2,0). In this way, DMA for YA lines is executed until an area (n,0). Then, the address jumps to an address represented by offset data (OFF3). Processing advances to processing for a rectangular area (0,1). DMA for areas (1,1), (2,1), . . . is controlled in the same way as described above. For example, if there are rectangular areas having different sizes (defined by XB and YB) because of the memory capacity, offset data (OFF1B and OFF2B) corresponding to the area sizes are further set to control DMA.

For the above-described rectangular area, as an area (overlap area) between rectangular areas, the number of pixels in the main scanning direction and the number of lines in the sub-scanning direction are set in accordance with the resolution in the main scanning direction and the pixel area to be referred to in accordance with the set image processing mode so that assignment (segmentation) of image data bitmapped on the memory is controlled.

Detailed Example

Figure 12A:
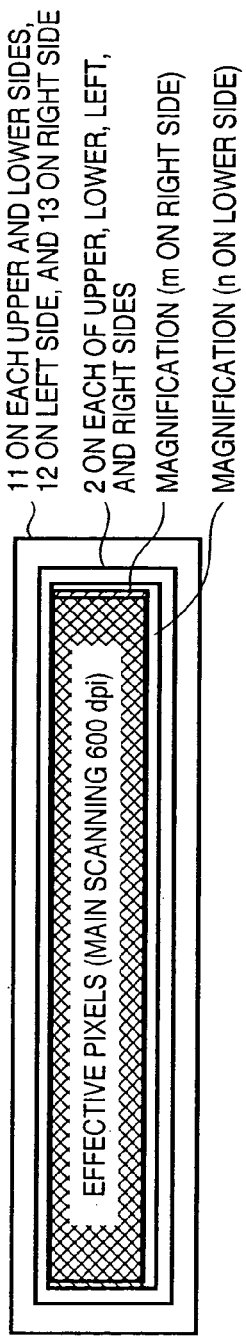
FIGS. 12A to 12C are views showing capacities necessary for the main memory in the respective image processing modes.
Figure 12B:
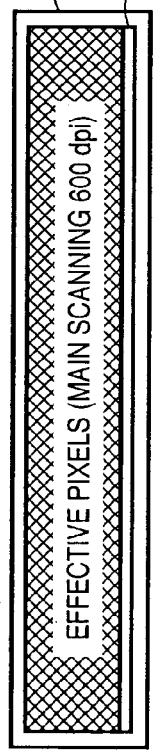
Figure 12C:
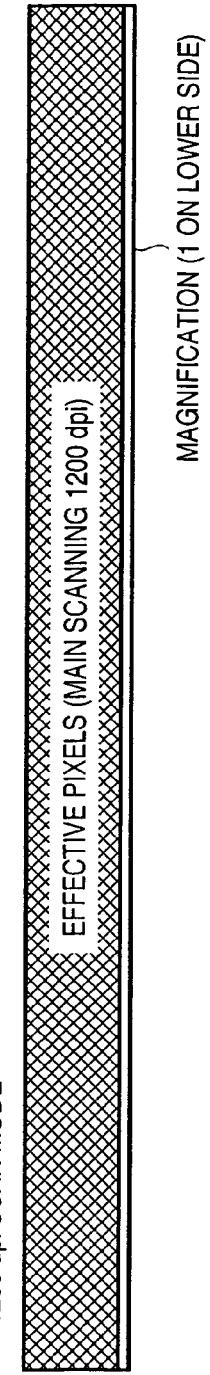

FIGS. 12A to 12C are views showing capacities necessary for the main memory in the respective image processing modes. The capacity in each processing mode is set in the following way.

(a) Color Copy Mode
  Effective pixels: 600 dpi in the main scanning direction
  Character determination processing: 11 lines on each of the upper and lower sides, 12 pixels on the left side, and 13 pixels on the right side
  Color determination filtering processing: two lines on each of the upper and lower sides, and two pixels on each of the left and right sides
  Magnification processing: n lines on the lower side and m pixels on the right side (m and n depend on the magnification factor)

(b) Monochrome Copy Mode
  Effective pixels: 600 dpi in the main scanning direction
  Color determination filtering processing: two lines on each of the upper and lower sides, and two pixels on each of the left and right sides
  Magnification processing: one line on the lower side (c) Color Scan Mode
  Effective pixels: 1,200 dpi in the main scanning direction
  Magnification processing: one line on the lower side Setting of the overlap width affects not only the memory resource but also the transfer efficiency between the main memory 100 and the scanner image processing section 20. The transfer efficiency is defined as the area ratio of the effective pixel area to the image area including the overlap area. As described above, in the copy mode, ensuring the overlap area is essential. Hence, the transfer efficiency is low. In the scanner mode, however, no overlap width is necessary except for magnification processing. Hence, the transfer efficiency is high.

For example, in the color copy mode shown in FIG. 12A, when a rectangular area including an overlap area is defined as 281 pixels×46 lines, an effective area obtained by subtracting the maximum overlap area (an area for character determination processing) is defined as 256 pixels×24 lines. The transfer efficiency is (256 pixels×24 lines)/(281 pixels×46 lines)=48%. On the other hand, in the scanner mode shown in FIG. 12C, no overlap area is necessary unless magnification processing is executed. Hence, the transfer efficiency is 100%.

The contents of image processing change between the scanner mode and the copy mode. A necessary memory area is appropriately set in accordance with the processing contents. For example, as shown in FIG. 12A, in the color copy mode, character determination processing or color determination processing is necessary. Hence, the overlap area (this area is indicated as an area ensured around the effective pixels in FIG. 12A) to extract the effective pixel area becomes large. However, since a resolution of about 600 dpi must be ensured as the number of effective pixels in the main scanning direction, the overlap area is decided by tradeoff with the memory area.

On the other hand, in the scanner mode, the overlap width need not be ensured except for magnification processing. However, about 1,200 dpi must be ensured as the number of effective pixels in the main scanning direction. When the memory assignment amount in the scanner mode should be almost be same as in the copy mode, the number of lines in the sub-scanning direction is set to, e.g., 24 lines. With this setting, the assignment amount of the main memory in the color copy mode can be almost the same as that in the scanner mode. The flows of storage processing in the respective image processing modes will be described below with reference to FIGS. 13 and 14.

<Storage Processing in Copy Mode>

Figure 13:
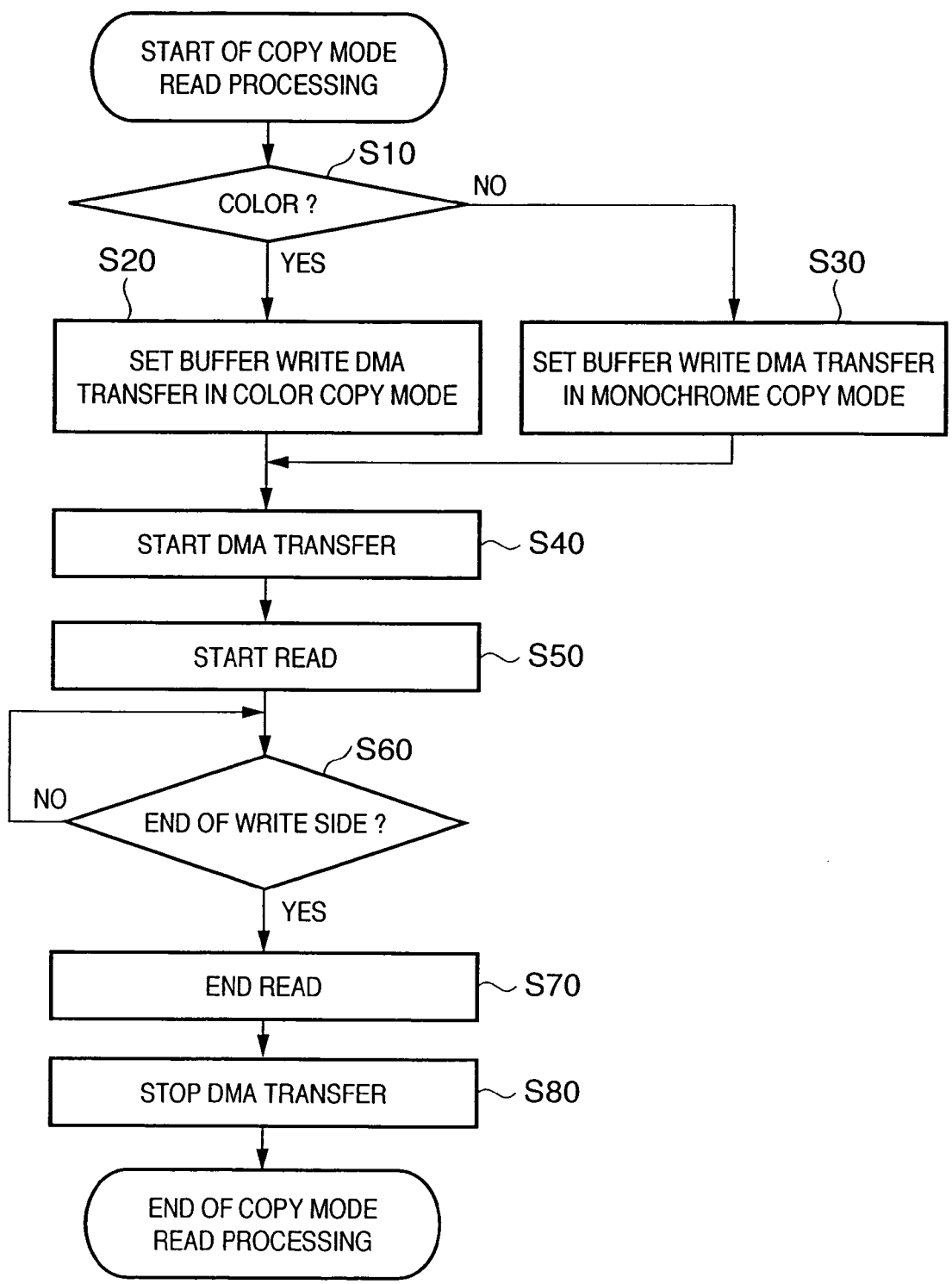
FIG. 13 is a flow chart for explaining the flow of data storage processing in the copy mode.

FIG. 13 is a flow chart for explaining the flow of data storage processing in the copy mode. First, in step S10, it is determined whether the copy mode is the color copy mode. In the color copy mode (YES in step S10), the processing advances to step S20 to set address information for DMA transfer in the color copy mode as follows.

(a) When data containing overlap width is to be written

Effective pixels (e.g., a resolution of 600 dpi in the main scanning direction) are ensured from the start of the buffer. In addition, an overlap width (11 lines on each of the upper and lower sides, 12 pixels on the left side, and 13 pixels on the right side) is set around the effective pixels (FIG. 12A).

(b) When only effective pixels are to be written

Start address SA
  =start address (BUFTOP) of memory+number of pixels (TOTALWIDTH) in main scanning direction of 1-page image containing overlap width×11 (overlap width (upper) in sub-scanning direction)+12 (overlap width (left) in main scanning direction) (TOTALWIDTH=number (IMAGEWIDTH) of main scanning effective pixels of 1-page image)+number of pixels of left overlap width+number of pixels of right overlap width)

UA=end address (BUFFBOTTOM) of memory+1
  =loop-back address of ring buffer

OFF1A=TOTALWIDTH−IMAGEWIDTH

In the monochrome copy mode (step S30), address information of DMA transfer is set in the following way.

(a) When data containing overlap width is to be written

Effective pixels (e.g., a resolution of 600 dpi in the main scanning direction) are ensured from the start of the buffer. In addition, an overlap width (two lines on each of the upper and lower sides, and two pixels on each of the left and right sides) is set around the effective pixels (FIG. 12B).

(b) When only effective pixels are to be written

Start address SA
= start address (BUFTOP) of memory+number of pixels (TOTALWIDTH) in main scanning direction of 1-page image containing overlap width×2 (overlap width (upper) in sub-scanning direction)+2 (overlap width (left) in main scanning direction)

UA=end address (BUFFBOTTOM) of memory+1

OFF1A=TOTALWIDTH−IMAGEWIDTH

When the address information for DMA transfer is set in step S20 or S30, the processing advances to step S40 to start DMA transfer. Data stored in the channels in the LDMAC_A 105a are sequentially read and DMA-transferred in accordance with the predetermined address information (S50 and S60). When the read of data stored in the channels (ch0 to ch2) is ended (S70), DMA transfer is ended (S80).

<Storage Processing in Scanner Mode>

Figure 14:
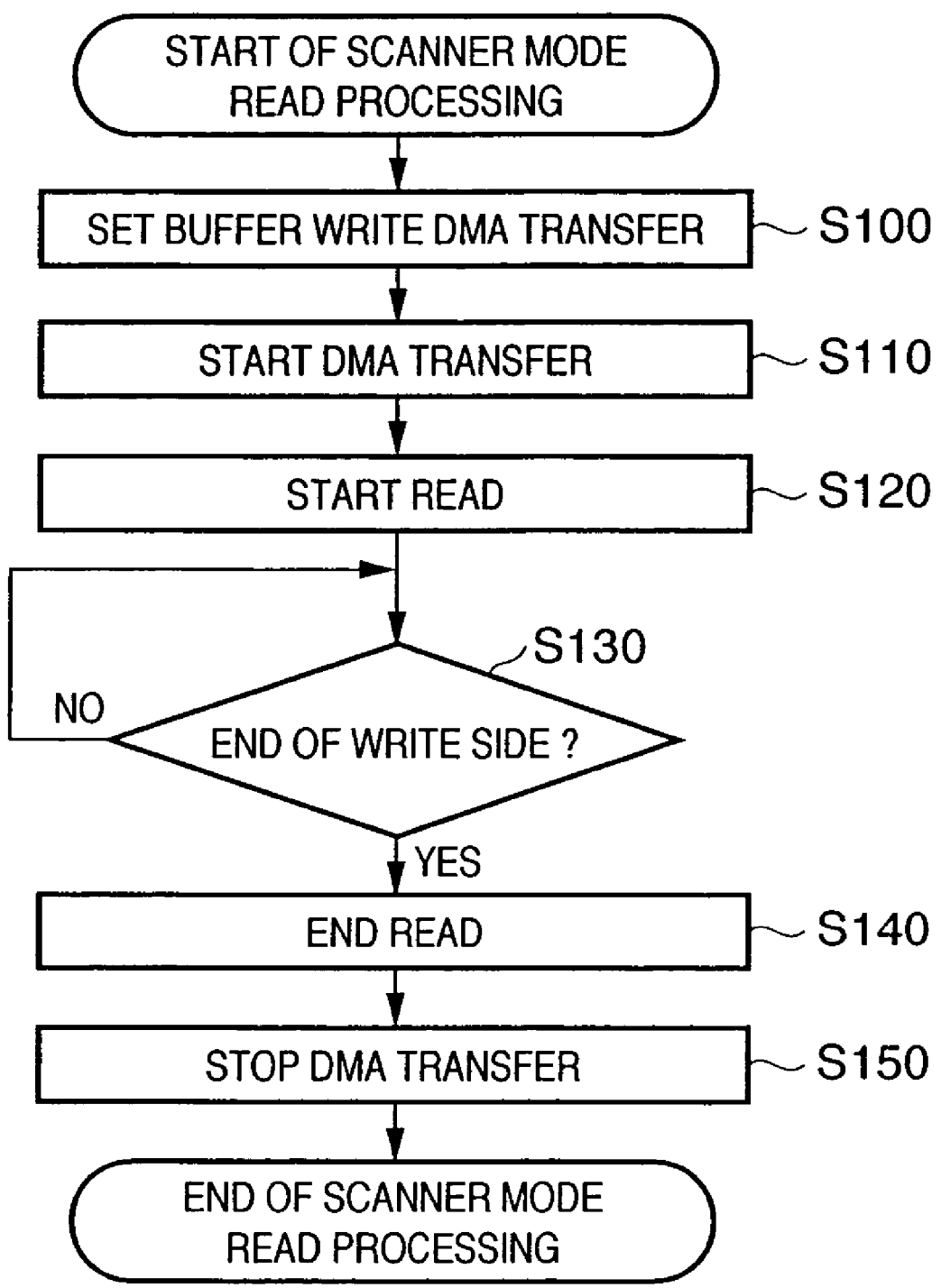
FIG. 14 is a flow chart for explaining the flow of data storage processing in the scanner mode.

FIG. 14 is a flow chart for explaining the flow of data storage processing in the scanner mode. First, in step S100, address information for DMA transfer in the scanner mode is set as follows.

(a) When data containing overlap width is to be written

Effective pixels (e.g., a resolution of 1,200 dpi in the main scanning direction) are ensured from the start of the buffer. In addition, an overlap width of one line on the lower side in the sub-scanning direction is ensured.

(b) When only effective pixels are to be written

Start address SA=start address (BUFTOP) of memory

UA=end address (BUFFBOTTOM) of memory+1
= loop-back address of ring buffer

OFF1A=0(TOTALWIDTH=IMAGEWIDTH)

When the address information is set in step S100, the processing advances to step S110 to start DMA transfer. Data stored in the channels in the LDMAC_A 105a are sequentially read out and DMA-transferred in accordance with the predetermined address information (S120 and S130). When the read of data stored in the channels (ch0 to ch2) is ended (S140), DMA transfer is ended (S150).

With the processing shown in FIG. 13 or 14, image data is bitmapped on the main memory 100 in accordance with the set processing mode. The overlap width shown in FIG. 13 or 14 is an arbitrarily settable parameter, and the scope of the present invention is not limited by this condition. For example, in color transmission of a photo, the character determination processing may be omitted. An arbitrary overlap width can be set in accordance with the necessary number of reference pixels in image processing such that only filter processing is to be executed.

<Data Read>

The image data bitmapped on the main memory 100 is loaded to the scanner image processing section 20 as corresponding R, G, and B data or monochrome image data for each predetermined rectangular area. Image processing is executed for each rectangular area. To execute image processing for each rectangular area, the CPU 180 prepares, in the main memory 100, shading (SHD) correction data that corrects a variation in sensitivity of the light-receiving element of the image reading device (CCD 17/CIS 18) or a variation in light amount of the LED 19. The shading data of the rectangular area and image data of the rectangular area are DMA-transferred to the scanner image processing section 20 by the LDMAC_B (105b) (to be described later).

Figure 15A:
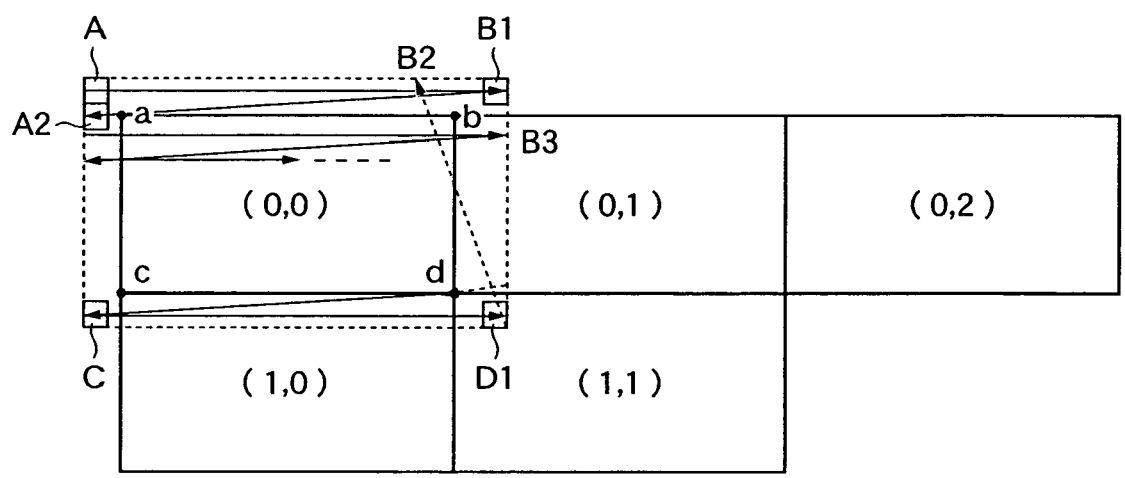
FIGS. 15A and 15B are views for explaining a data read when image data in a rectangular area is to be transferred to the block buffer RAM of a scanner image processing section 20.
Figure 15B:
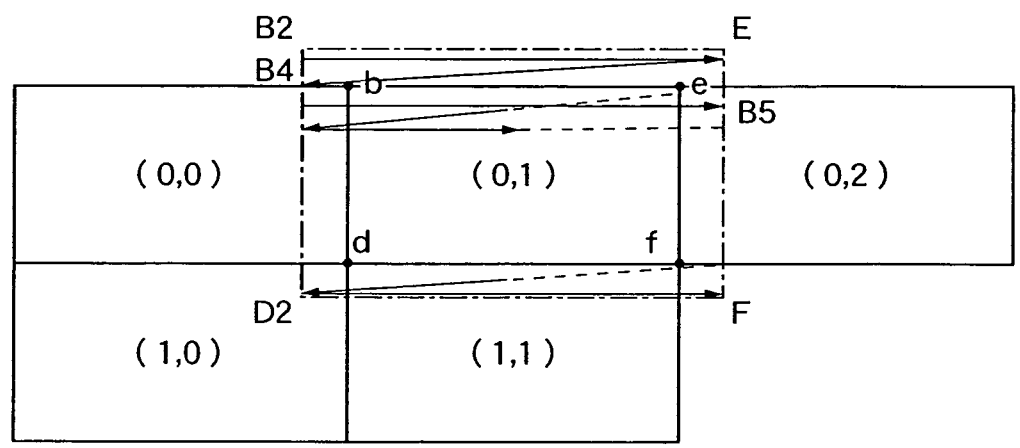

FIGS. 15A and 15B are views for explaining a data read when image data in a rectangular area is to be transferred to a block buffer RAM 210 (FIG. 16) of the scanner image processing section 20. An overlap area AB1CD1 is set for the effective pixel area (abcd) of an area (0,0) (FIG. 15A). In reading image data, corresponding data is read from the start address A to the address B1 in the main scanning direction. When the read of the data in the main scanning direction is ended, the address of data to be read next is shifted to the address A2 in FIG. 15A by one line in the sub-scanning direction. The data is read until the pixel at the address B3 in the main scanning direction. The data is read in a similar manner. Data from the address C to the address D1, which correspond to the last line of the overlap area, is read in the main scanning direction. The read of the data in the area (0,0) is thus ended.

An overlap area B2ED2F is set for the effective pixel area (bedf) of an area (0,1) (FIG. 15B). In reading image data, corresponding data is read from the start address B2 to the address E in the main scanning direction. When the read of the data in the main scanning direction is ended, the address of data to be read next is shifted to the address B4 in FIG. 15B by one line in the sub-scanning direction. The data is read until the pixel at the address B5 in the main scanning direction. Data from the address D2 to the address F, which correspond to the last line of the overlap area, is read out in the main scanning direction. The read of the data in the second area is thus ended. With the above processing, the data of the rectangular area including the overlap area is read. The same processing as described above is executed for each rectangular area.

<Composition of LDMAC_B (105b)>

The read of data stored in the main memory 100 is controlled by the LDMAC_B (105b) shown in FIG. 7. A read data I/F section 72a is connected to the main memory 100 through a fourth bus 74 for the data read. The read data I/F section 72a can read predetermined image data from the main memory 100 by referring to address information generated by the LDMAC_B (105b).

The read data are set to a plurality of predetermined channels (ch3 to ch6) by a data setting unit 72b. For example, image data for shading correction is set to channel 3 (ch3). Plane-sequential R data is set to channel 4 (ch4). Plane-sequential G data is set to channel 5 (ch5). Plane-sequential B data is set to channel 6 (ch6).

The data set to the channels (ch3 to ch6) are sequentially DMA-transferred through an I/P interface 72c under the control of the LDMAC_B (105b) and loaded to the block buffer RAM 210 (FIG. 16) of the scanner image processing section 20.

Channel 7 (ch7) in the LDMAC_B (105b) is a channel which stores dot-sequential image data output from the scanner image processing section 20 to store data that has undergone predetermined image processing in the main memory 100. The scanner image processing section 20 outputs address information (block end signal and line end signal) in accordance with the output of dot-sequential image data. On the basis of the address information, a second write data I/F 72d stores the image data stored in channel 7 in the main memory 100. The contents of this processing will be described later in detail.

<Image Processing>

FIG. 16 is a block diagram for explaining the schematic composition of the scanner image processing section 20. Processing corresponding to each image processing mode is executed for the data loaded to the block buffer RAM 210. FIGS. 19A to 19D are views schematically showing the sizes of rectangular areas necessary for the respective image processing modes. The scanner image processing section 20 executes processing while switching the rectangular pixel area to be referred to for the rectangular area in accordance with the set image processing mode. The contents of the image processing will be described below with reference to FIG. 16. The sizes of the rectangular areas to be referred to at that processing will be described with reference to FIGS. 19A to 19D.

Referring to FIG. 16, a shading correction block (SHD) 22 is a processing block which corrects a variation in light amount distribution of the light source (LED 19) in the main scanning direction, a variation between light-receiving elements of the image reading device, and the offset of the dark output. As shading data, correction data corresponding to one pixel is plane-sequentially stored in an order of bright R, bright G, bright B, dark R, dark G, and dark B on the main memory 100. Pixels (XA pixels in the main scanning direction and YA pixels in the sub-scanning direction (FIG. 19A)) corresponding to the rectangular area are input. The input plane-sequential correction data is converted into dot-sequential data by an input data processing section 21 and stored in the block buffer RAM 210 of the scanner image processing section 20. When reception of the shading data of the rectangular area is ended, the processing shifts to image data transfer.

The input data processing section 21 is a processing section which executes processing for reconstructing plane-sequential data separated into R, G, and B data to dot-sequential data. Data of one pixel is stored on the main memory 100 as plane-sequential data for each of the R, G, and B colors. When these data are loaded to the block buffer RAM 210, the input data processing section 21 extracts 1-pixel data for each color data and reconstructs the data as R, G, or B data of one pixel. The reconstruction processing is executed for each pixel, thereby converting the plane-sequential image data into dot-sequential image data.

Figure 17:
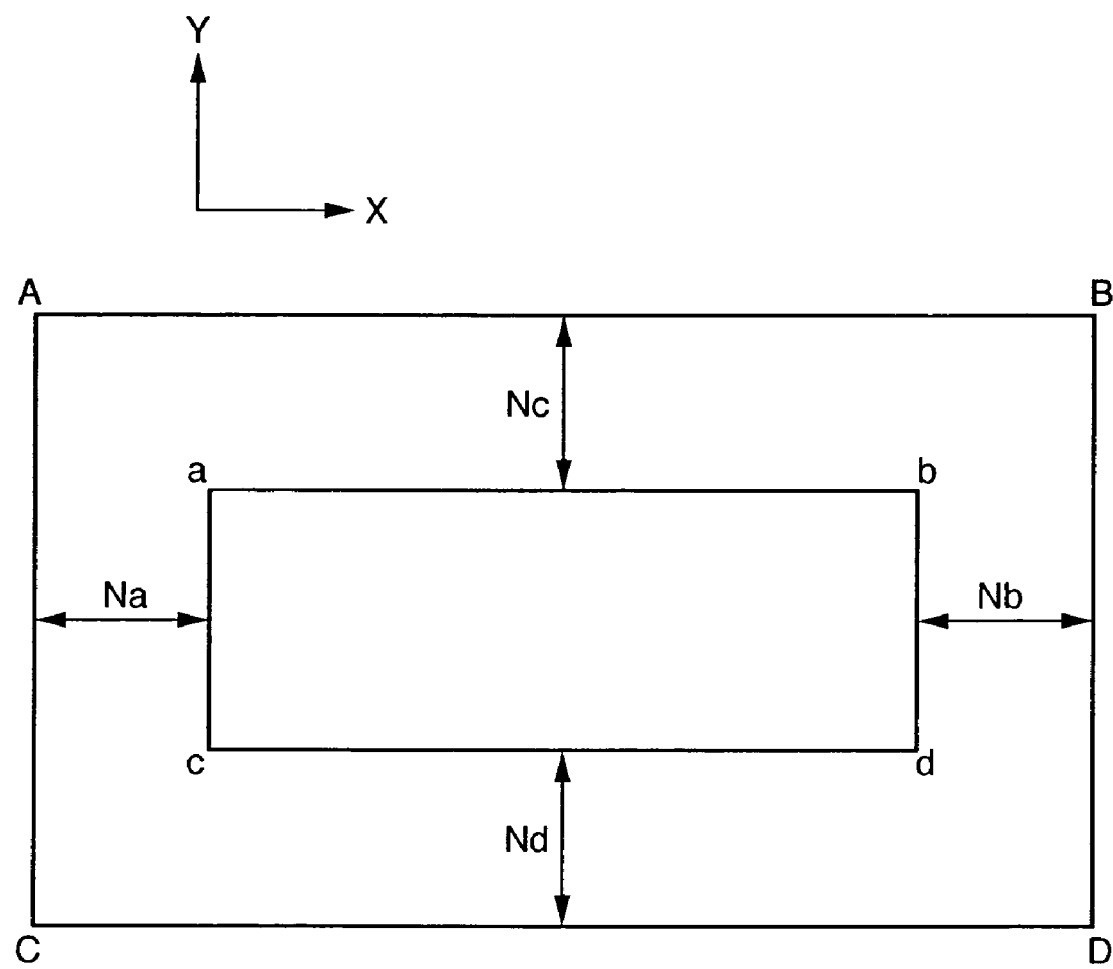
FIG. 17 is a view schematically showing an area to be subjected to image processing and a reference area where filter processing and the like for the image processing are to be executed.

FIG. 17 is a view schematically showing an area to be subjected to image processing and a reference area (ABCD) where filter processing and the like for the processing are to be executed. Referring to FIG. 17, "Na" and "Nb" pixels are set as overlap widths in the main scanning direction (X direction), and "Nc" and "Nd" pixels are set as overlap widths in the sub-scanning direction (Y direction) for the effective pixel area (abcd).

FIGS. 18A and 18B are views showing overlap widths in the respective image processing modes (color copy mode, monochrome copy mode, and scanner mode). In the magnification mode, the size of the reference area becomes larger by m pixels and n lines than that in the 1× mode because of the necessity of magnification processing. In the color copy mode, the largest reference area in all the image processing modes is necessary because black characters should be determined. To detect black characters, halftone dots and black characters must properly be determined. To determine the period of halftone dots, a reference area having (24+m) pixels in the main scanning direction and (21+n) pixels in the sub-scanning direction (in the magnification mode) is set. In the monochrome copy mode, to execute edge enhancement for a character portion, a reference area having (4+m) pixels in the main scanning direction and (4+n) pixels in the sub-scanning direction (in the magnification mode) is set. In the scanner mode, no reference area is necessary in the 1× mode because necessary image processing is executed by the scanner driver or application on the host computer. In the magnification mode, a reference area having m pixels in the main scanning direction and n pixels in the sub-scanning direction is set in accordance with the magnification factor. The present invention is not limited to the overlap widths described here. The overlap width can arbitrarily be set.

In a processing block 23, an averaging processing section (SUBS) is a processing block which executes sub-sampling (simple thinning) for decreasing the read resolution in the main scanning direction or averaging processing. An input masking processing section (INPMSK) is a processing block which calculates color correction of input R, G, and B data. A correction processing section (LUT) is a processing block which applies a predetermined gray level characteristic to input data.

A character determination processing block 24 is a processing block which determines black characters and the pixels of a line drawing contour in input image data. In black character determination processing, an area more than the period of halftone dots must be referred to, as described above. Hence, an overlap area corresponding to (24+m) pixels in the main scanning direction and (21+n) pixels (lines) in the sub-scanning direction (m and n are defined by the magnification factor) is preferably referred to. For the input data to the character determination processing block 24, data corresponding to XA pixels in the main scanning direction (effective pixels+overlap width)×YA pixels in the sub-scanning direction (effective pixels+overlap width) (FIG. 19A) is referred to, like the input to the shading correction block (SHD) 22.

Figure 19A:
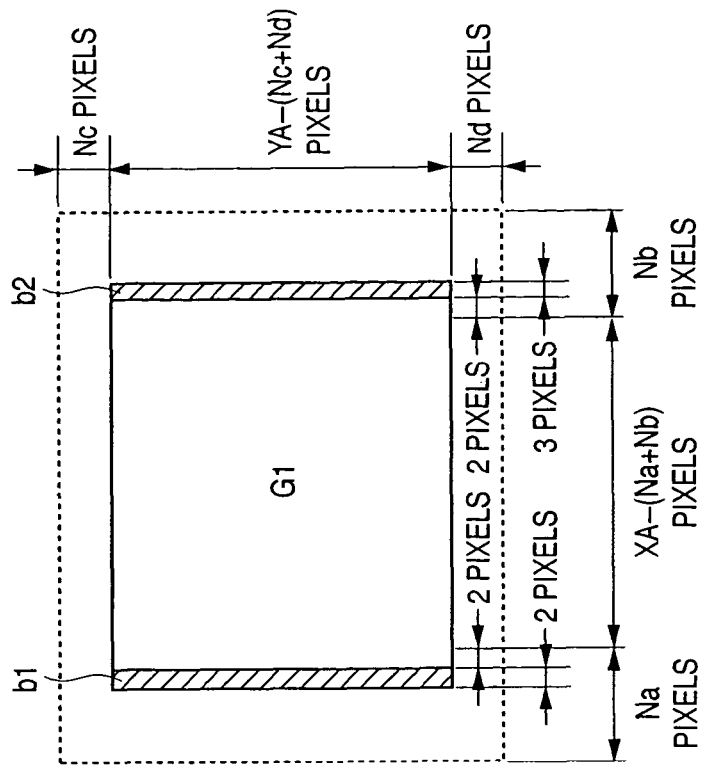
Figure 19B:
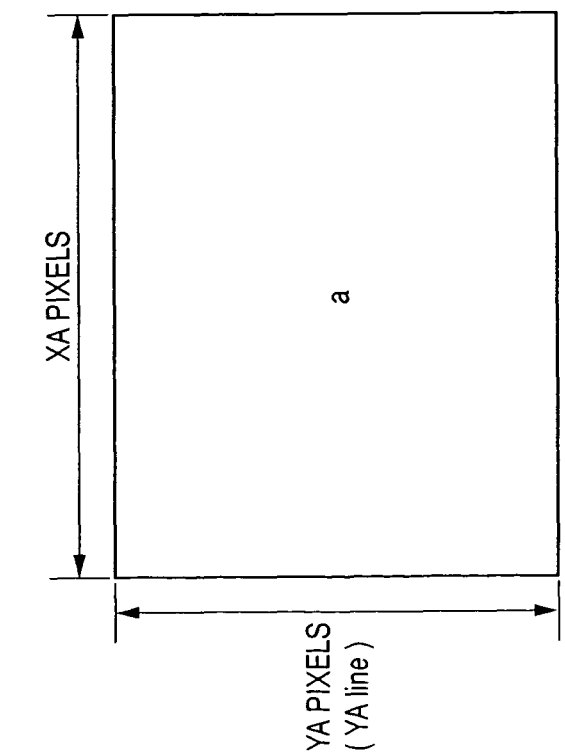

In a processing block 25, an MTF correction processing section is a processing section which executes MTF difference correction and filter processing in the main scanning direction to reduce moiré in reducing the image when the image reading device is changed. This block executes multiplication/addition processing of coefficients for predetermined pixels in the main scanning direction in an area of interest. Referring to FIG. 19B, two pixels of a left hatching portion (b1) and three pixels of a right hatching portion (b2) are ensured for an area G1 of interest, and processing for the area G1 is executed.

An (RGB (L, Ca, Cb)) conversion processing section (CTRN) executes conversion processing of multilevel image data of each of R, G, and B colors in filtering (brightness enhancement, saturation enhancement, and color determination) executed by a filter processing block 26 on the output side.

A background density adjustment processing section (ABC) executes processing for automatically recognizing the background density of an original and correcting the background density value to the white side to obtain binary data suitable for facsimile communication or the like.

The filter processing block 26 executes edge enhancement processing of the brightness component (L) of the image and enhancement processing of saturation (Ca, Cb) as processing for executing color determination and filtering for the data obtained in the preceding CTRN processing. The filter processing block 26 also determines the chromatism of the input image and outputs the result. The filter processing block 26 can also change the parameter of the enhancement amount on the basis of the character or line drawing contour portion determination signal generated by the character determination processing block 24. The data that has undergone the filter processing is converted from L, Ca, and Cb to R, G, and B data and output. When monochrome image data is to be processed, this processing block functions as an edge enhancement filter for 5×5 pixels.

Referring to FIG. 19C, for an area G2 of interest, the above-described filter processing is executed by using an area (hatched area) corresponding to two pixels (lines) on each of the upper and lower sides and two pixels on each of the left and right sides as reference data.

A magnification processing (LIP) block 27 is a processing block which executes linear interpolation magnification processing in the main and sub-scanning directions. Referring to FIG. 19D, an area G3 is obtained as a result of linear interpolation magnification processing. The area of the area G3 is decided by magnifying the hatched area of image data (d: (X−(Na+Nb) pixels)×(Y−(Nc+Nd) pixels)) in the main and sub-scanning directions in accordance with predetermined magnification factor (main scanning direction (+m pixels) and sub-scanning direction (+n lines)).

Referring to FIGS. 19B to 19D, "Na" and "Nb" indicate the numbers of pixels which are set as overlap widths in the main scanning direction (X direction), and "Nc" and "Nd" indicate the numbers of pixels which are set as overlap widths in the sub-scanning direction (Y direction), as in FIG. 17.

The above image processing is executed for image data of each rectangular area in accordance with the set image processing mode (copy mode or scanner mode). When a rectangular area corresponding to an image processing mode is set on the memory, and the unit of the rectangular area is switched, a resolution and high-resolution processing corresponding to the image processing mode can be implemented. Each rectangular area contains an overlap width necessary for image processing of each processing block. Hence, the image data of an adjacent area need not be read for each rectangular area to process the end portion of the rectangular image data to be processed. The work memory can further be reduced as compared to the method which simply segments an image into rectangular areas and executes image processing.

Figure 20:
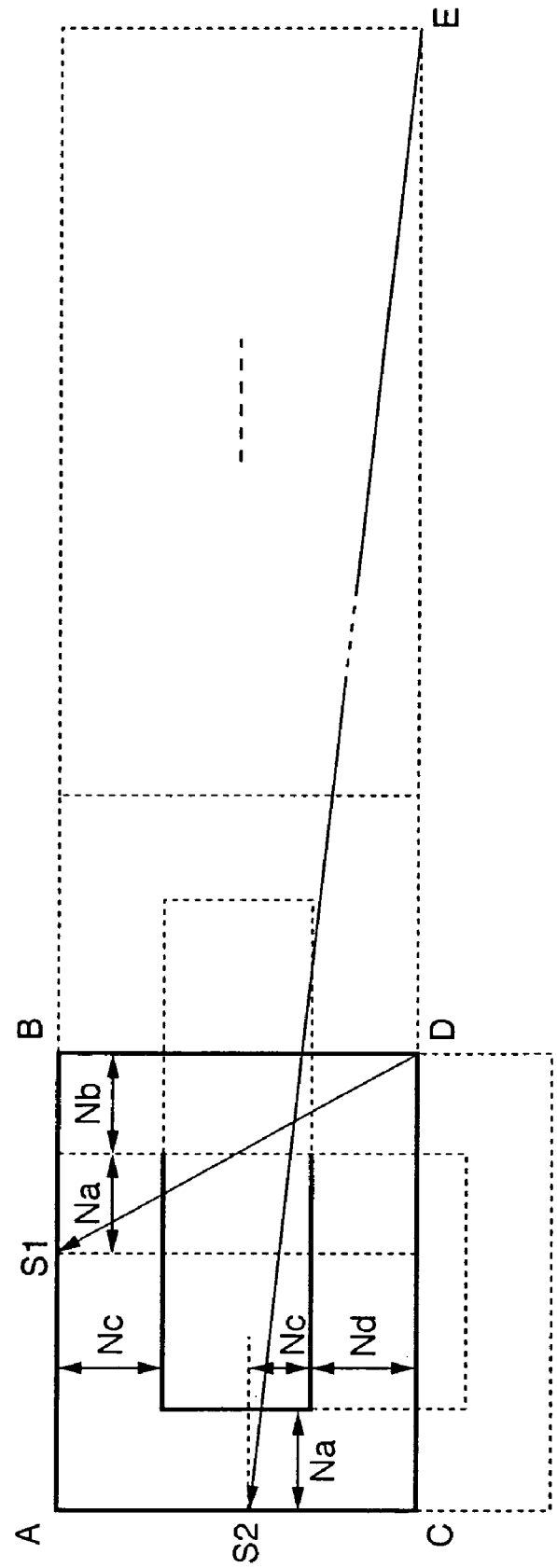
FIG. 20 is a view for explaining the start point in the DMA main scanning direction to DMA-transfer image data of the next rectangular data after the end of processing of one rectangular data.

FIG. 20 is a view for explaining the start point in the DMA main scanning direction to DMA-transfer image data of the next rectangular data after the end of processing of one rectangular data. When DMA of the first rectangular area ABCD is ended, and transfer until the pixel at a point D is ended, the start point in the main scanning direction is set at a position (point S1 in FIG. 20) that is returned by Na+Nb pixels in the main scanning direction. When DMA of rectangular data corresponding to one line is sequentially ended, and DMA of a point E corresponding to the final data of the first line is transferred, the start point shifted in the sub-scanning direction to transfer the rectangular data of the next line is set at a position (S2 in FIG. 20) that is returned by Nc+Nd pixels.

Figure 21:
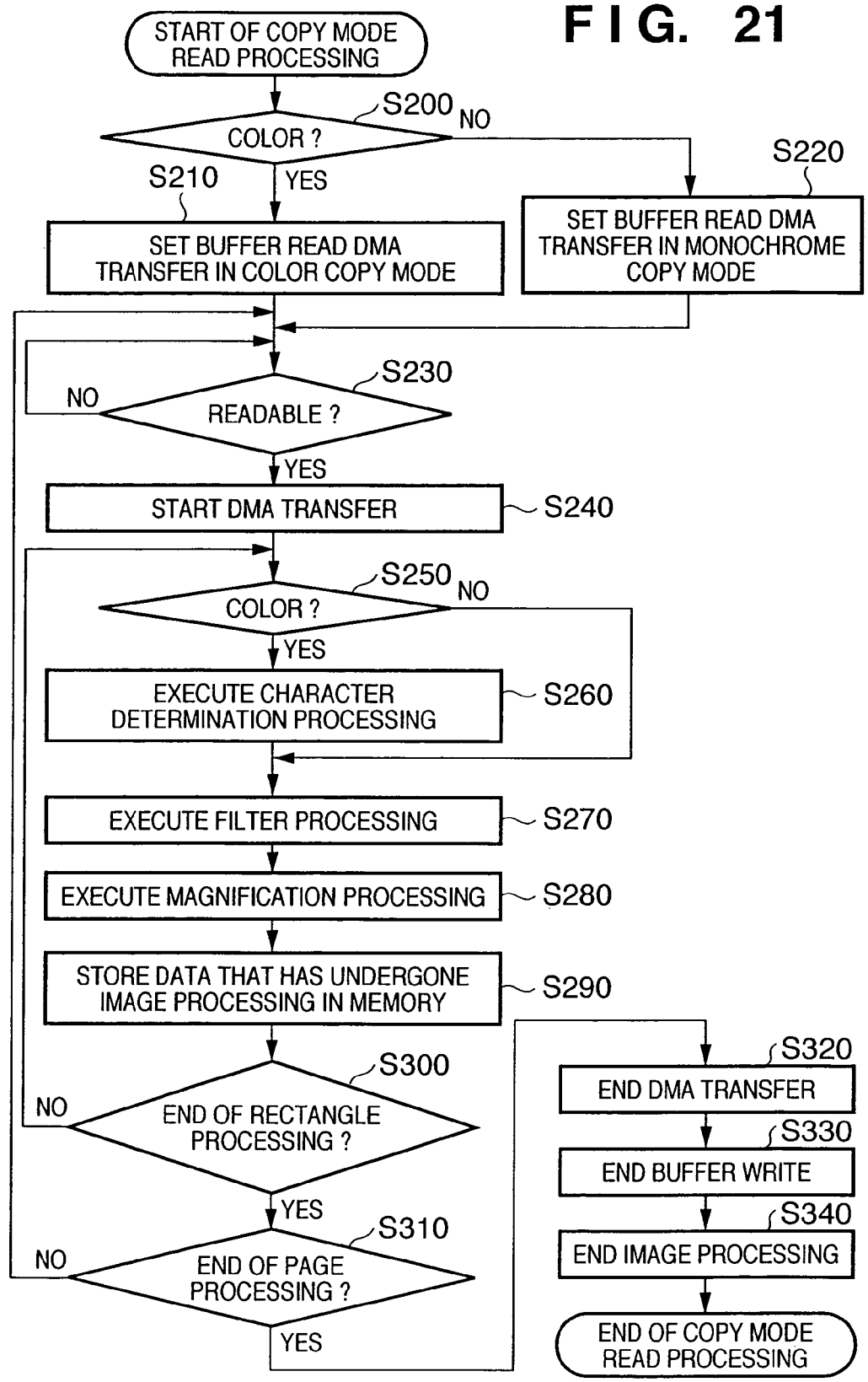
FIG. 21 is a flow chart for explaining the flow of a data read and image processing in the copy mode.
Figure 22:
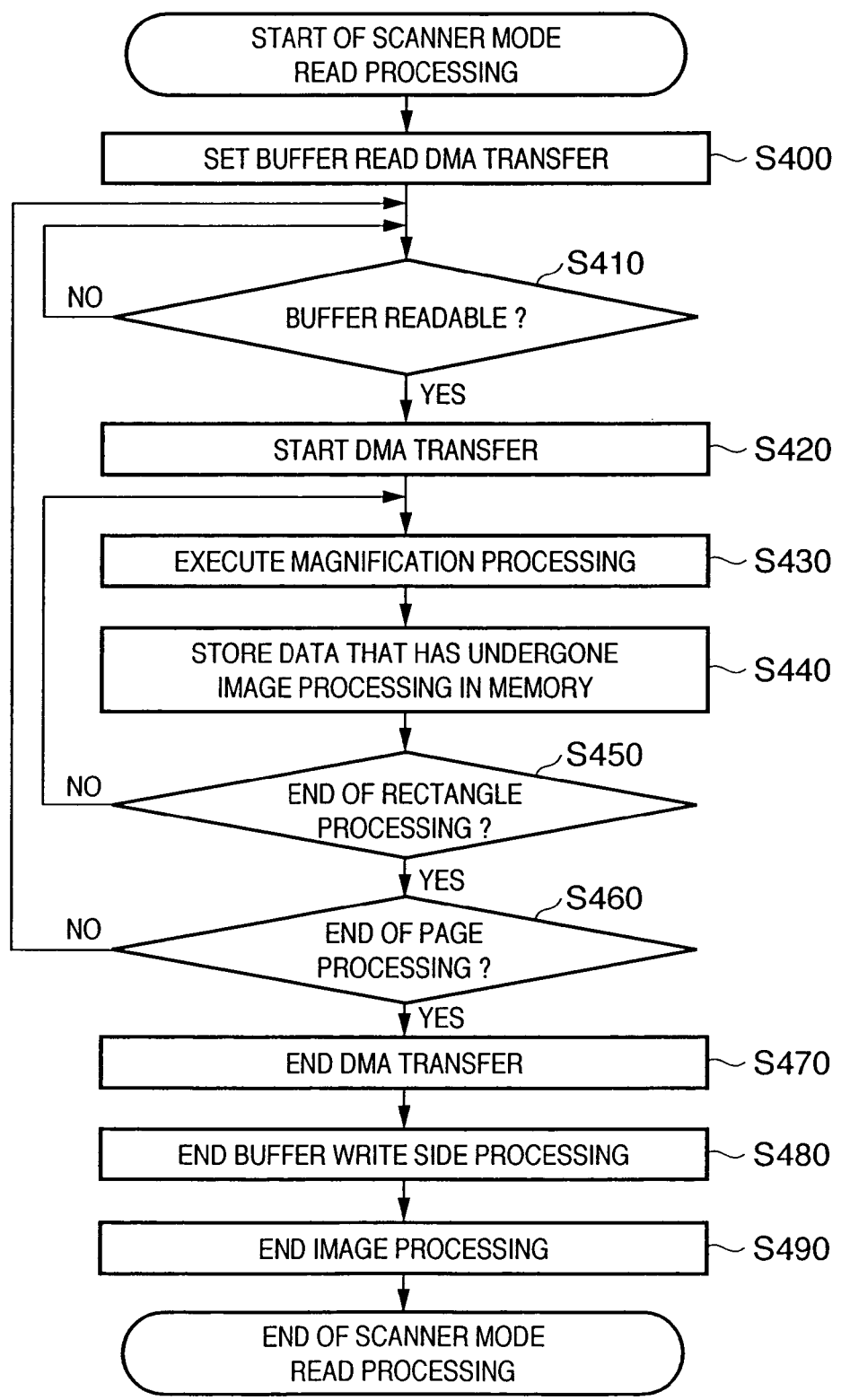
FIG. 22 is a flow chart for explaining the flow of a data read and image processing in the scanner mode.

FIGS. 21 and 22 are flow charts for explaining the flow of DMA transfer processing and image processing in the respective image processing modes. Referring to FIGS. 21 and 22, detailed numerical values are used as address information. However, the present invention is not limited to these numerical values, and the address information can arbitrarily be set.

<Processing in Copy Mode>

FIG. 21 is a flow chart for explaining the flow of a data read and image processing in the copy mode. First, in step S200, it is determined whether the copy mode is the color mode. In the color mode (YES in step S200), the processing advances to step S210. In the monochrome mode (NO in step S200), the processing advances to step S220.

In step S210, address information for the read in the color copy mode is set as follows. This address information is generated by the LDMAC_B (105b) (this also applies to step S220). On the basis of the address information, the LDMAC_B (105b) controls DMA.

Start address (SA)=start address (BUFTOP) of memory
UA=end address (BUFFBOTTOM) of memory+1
XA=rectangular effective main scanning pixels+overlap width (number of pixels of left overlap width (12 pixels) and number of pixels of right overlap width (13 pixels))
YA=rectangular effective sub-scanning pixels (lines)+overlap width (number of pixels of upper overlap width (11 pixels (lines)) and number of pixels of lower overlap width (11 pixels (lines)))
OFF1A=TOTALWIDTH−XA
OFF2A=−(TOTALWIDTH×YA+overlap width (12 pixels on left side and 13 pixels on right side))
OFF3A=−(TOTALWIDTH×(overlap width (11 pixels on upper side and 11 pixels on lower side)+effective main scanning pixels+overlap width (12 pixels on left side and 13 pixels on right side))
(TOTALWIDTH=number (IMAGEWIDTH) of main scanning effective pixels of 1-page image+number of pixels of left overlap width+number of pixels of right overlap width)
XANUM=effective main scanning pixels/rectangular effective main scanning pixels In step S220, address information for the read in the monochrome copy mode is set as follows.

Start address (SA)=start address (BUFTOP) of memory
UA=end address (BUFFBOTTOM) of memory+1
XA=rectangular effective main scanning pixels+overlap width (number of pixels of left overlap width (2 pixels) and number of pixels of right overlap width (2 pixels))
YA=rectangular effective sub-scanning pixels (lines)+overlap width (number of pixels of upper overlap width (2 pixels (lines)) and number of pixels of lower overlap width (2 pixels (lines)))
OFF1A=TOTALWIDTH−XA
OFF2A=−(TOTALWIDTH×YA+overlap width (2 pixels on left side and 2 pixels on right side))
OFF3A=−(TOTALWIDTH×(overlap width (2 pixels on upper side and 2 pixels on lower side)+effective main scanning pixels+overlap width (12 pixels on left side and 13 pixels on right side))
(TOTALWIDTH=number (IMAGEWIDTH) of main scanning effective pixels of 1-page image+number of pixels of left overlap width+number of pixels of right overlap width)
XANUM=effective main scanning pixels/rectangular effective main scanning pixels When the address information is set in the read data I/F section 72a in step S210 or S220, the processing advances to step S230 to determine whether the LDMAC_B (105b) is in a data readable state. For example, when the buffer controller 75 inhibits a buffer read, the processing waits until the state is canceled (NO in step S230). If a buffer read can be executed (YES in step S230), the processing advances to step S240.

In step S240, the read data I/F section 72a reads data in accordance with the set address information. The data setting unit 72b sets the data in predetermined channels (ch3 to ch6). The LDMAC_B (105b) DMA-transfers the data set in the respective channels to the buffer RAM 210 of the scanner image processing section 20. The DMA-transferred data is loaded to the buffer of the scanner image processing section 20 and subjected to image processing corresponding to each image processing mode. The contents of each image processing have already been described above, and a detailed description thereof will be omitted here.

The loaded shading correction data and image data are converted by the above-described input data processing section 21 from plane-sequential data to dot-sequential data and subjected to the following image processing.

In step S250, it is determined whether the copy mode is the color copy mode. In the color copy mode (YES in step S250), the processing advances to step S260 to execute character determination processing. In the monochrome copy mode (NO in step S250), step S260 (character determination processing) is skipped. Filter processing is executed in step S270, and magnification processing is executed in step S280.

The above processing is executed for each rectangular area data. In step S290, dot-sequential image data that has undergone the image processing is further DMA-transferred to and stored in a predetermined memory area where data that has undergone image processing is to be stored. This storage processing will be described later in detail.

In step S300, it is determined whether the image processing of the rectangular area and data storage processing are ended. If NO in step S330, the processing returns to step S250 to execute the same processing as described above. If the processing of the rectangular area is ended (YES in step S300), the processing advances to step S310 to determine whether the processing of rectangular areas that construct the entire page is ended (S310). If the processing of the entire page is not ended (NO in step S310), the processing returns to step S230 to read out the subsequent image data from the main memory 100 and execute image processing (steps from S230) for the data.

On the other hand, when the page processing is ended (YES in step S310), the processing advances to step S320 to end DMA transfer to the scanner image processing section 20 (S320) and data write processing to the buffer by the scanner image processing section 20 (S330). Thus, the image processing by the scanner image processing section 20 is ended (S340).

With the above processing, the image processing for the data read in the copy mode is completed.

<Processing in Scanner Mode>

FIG. 22 is a flow chart for explaining the flow of a data read and image processing in the scanner mode. First, in step S400, address information to read out data from the main memory 100 is set as follows. This address information is generated by the LDMAC_B (105b). On the basis of the address information, the LDMAC_B (105b) controls DMA.

Start address (SA)=start address (BUFTOP) of memory
UA=end address (BUFFBOTTOM) of memory+1
XA=rectangular effective main scanning pixels
YA=rectangular effective sub-scanning pixels (lines)+ overlap width (number of pixels of lower overlap width (1 pixel (line))
OFF1A=TOTALWIDTH−XA
OFF2A=−(TOTALWIDTH×YA)
OFF3A=−(TOTALWIDTH×(overlap width (number of pixels of lower overlap width (1 pixel))+effective main scanning pixels)
(TOTALWIDTH=number (IMAGEWIDTH) of main scanning effective pixels of 1-page image+number of pixels of left overlap width+number of pixels of right overlap width)
XANUM=effective main scanning pixels/rectangular effective main scanning pixels When the address information is set in the read data I/F section 72a in step S400, the processing advances to step S410 to determine whether the LDMAC_B (105b) is in a data readable state. For example, when the buffer controller 75 inhibits a buffer read, the processing waits until the state is canceled (NO in step S410). If a buffer read can be executed (YES in step S410), the processing advances to step S420.

In step S420, the read data I/F section 72a reads data in accordance with the set address information. The data setting unit 72b sets the data in predetermined channels (ch3 to ch6). The LDMAC_B (105b) DMA-transfers the data set in the respective channels to the buffer of the scanner image processing section 20. The DMA-transferred data is loaded to the buffer of the scanner image processing section 20 and subjected to image processing corresponding to each image processing mode. The contents of the image processing have already been described above, and a detailed description thereof will be omitted.

The loaded image data is converted by the above-described input data processing section 21 from plane-sequential data to dot-sequential data and subjected to magnification processing in step S430.

In step S440, dot-sequential image data that has undergone the image processing is further DMA-transferred to and stored in a predetermined memory area where data that has undergone image processing is to be stored. This storage processing will be described later in detail.

In step S450, it is determined whether the image processing of the rectangular area and data storage processing are ended. If NO in step S450, the processing returns to step S430 to execute the same processing as described above. If the processing of the rectangular area is ended (YES in step S450), the processing advances to step S460 to determine whether the processing of the entire page is ended (S460). If the processing of the entire page is not ended (NO in step S460), the processing returns to step S410 to read out the subsequent image data from the main memory 100 and execute image processing for the data.

On the other hand, when the page processing is ended (YES in step S460), the processing advances to step S470 to end DMA transfer to the scanner image processing section 20 (S470) and data write processing to the buffer by the scanner image processing section 20 (S480). Thus, the image processing by the scanner image processing section 20 is ended (S490).

With the above processing, the image processing for the image data read in the scanner mode is completed.

When a rectangular area containing a predetermined overlap width is set in accordance with the image processing mode, and image processing is executed for each rectangular area, predetermined image processing can be executed without intervention of individual line buffers of each image processing section.

<Storage of Data That Has Undergone Image Processing>

Figure 23:
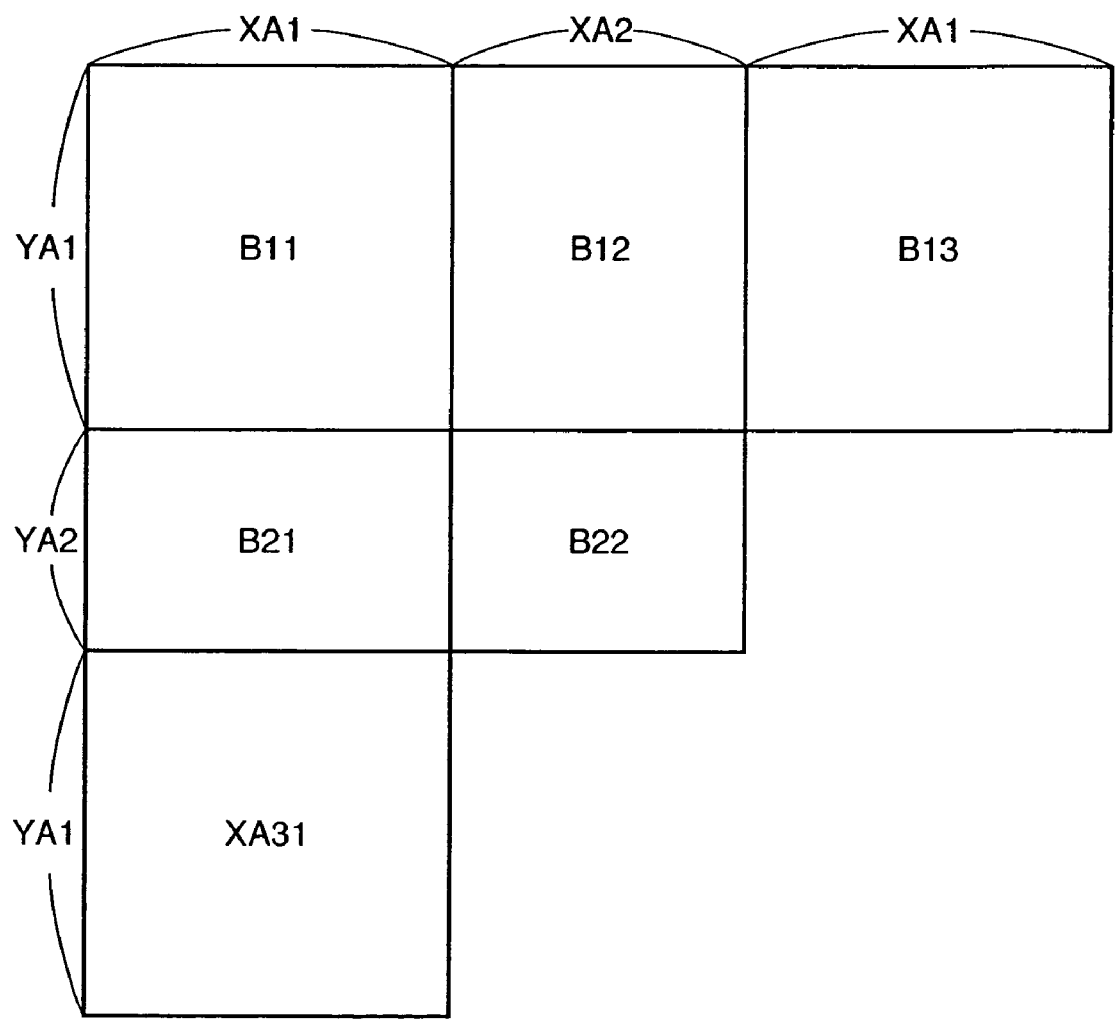
FIG. 23 is a view for explaining processing for transferring magnified rectangular data from a magnification processing block (LIP) 27 to the main memory 100.
Figure 24:
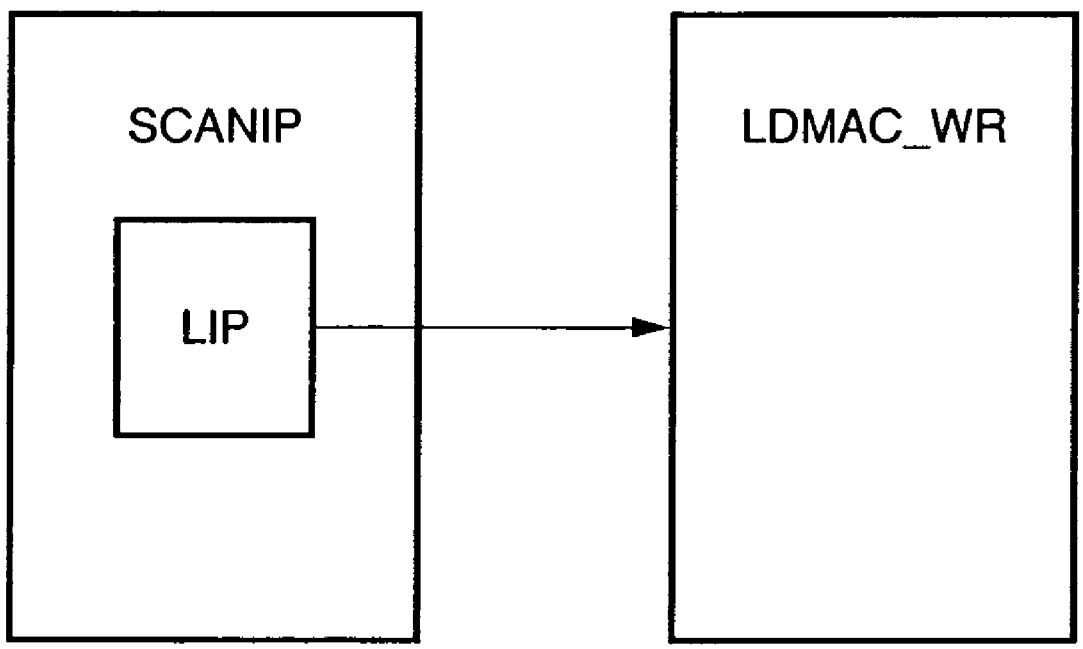
FIG. 24 is a view showing connection between the magnification processing block (LIP) 27 and the LDMAC_B (105b)

FIG. 23 is a view for explaining processing for transferring magnified rectangular data from the magnification processing block (LIP) 27 to the main memory 100. For example, when rectangular data having 256×256 pixels is to be reduced to 70%, 256 pixels×0.7=179.2 pixels. Rectangular data having 179.2×179.2 pixels must be created on the basis of the numerical calculation. However, pixel data on which a numerical value with decimal places is reflected cannot be generated. The appearance probability of 180 pixels and 179 pixels is controlled to 2:8 in the main scanning direction and in the sub-scanning direction to entirely generate 179.2 pixels corresponding to the reduction magnification factor of 70%. Referring to FIG. 23, the rectangular areas, i.e., an area B11 (XA1=180 pixels) and an area B12 (XA2=179 pixels) have difference sizes in the main scanning direction. The rectangular areas, i.e., the area B11 (YA1=180 pixels) and an area B21 (YA2=179 pixels) have difference sizes in the sub-scanning direction. The appearance probability of rectangular areas having different sizes is controlled in accordance with the result of magnification processing so that predetermined magnified image data can be obtained. To return the data that has undergone the image processing to the main memory 100, the signal that controls DMA is sent from the magnification processing block (LIP) 27 to the LDMAC_B (105b).

Figure 25:
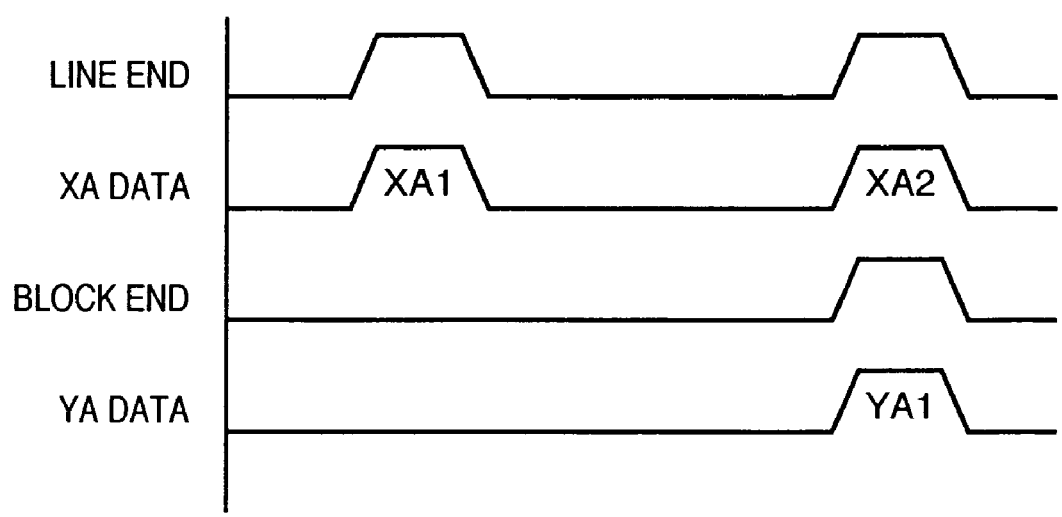
FIG. 25 is a timing chart showing the relationship between data and signals sent from the magnification processing block (LIP) 27 to the LDMAC_B (105b) to DMA-transfer data that has undergone image processing to the main memory 100.

The processing in step S290 in FIG. 21 or step S440 in FIG. 22 will be described next. FIG. 25 is a timing chart showing the relationship between data and signals sent from the magnification processing block (LIP) 27 to the LDMAC_B (105b) to DMA-transfer the data that has undergone image processing to the main memory 100.

When the data that has undergone the image processing is to be stored in the main memory 100, the LDMAC_B (105b) starts DMA transfer without knowing the main scanning length and sub-scanning length of a rectangular area. When the magnification processing block 27 transfers the final data (XA1 and XA2) with the main scanning width in one rectangle, a line end signal is output. With the line end signal, the LDMAC_B (105b) is notified of the main scanning length of the rectangle by the magnification processing block 27.

When the magnification processing block 27 transfers the final data in one rectangle, a block end signal is output to the LDMAC_B (105b). With this signal, the sub-scanning length can be recognized. When all data in the sub-scanning direction YA1 are processed, DMA transfer is shifted to the areas B21 and B22 (FIG. 23). In a similar manner, data XA in the main scanning direction is sent. DMA is controlled by the line end signal and block end signal. Accordingly, the rectangular area of DMA can dynamically be switched in accordance with the calculation result of the magnification processing block 27.

The above-described line end signal, block end signal, and dot-sequential image data are input to the interface section 72c of the LDMAC_B (105b). Of these data, the image data is stored in channel (ch) 7. The line end signal and block end signal are used as address information in bitmapping the data stored in channel (ch) 7 on the main memory 100. On the basis of these pieces of address information, the second write data I/F section 72d reads out the data in ch7 and stores it on the main memory 100.

FIG. 26 is a view for explaining a state in which the data is bitmapped on the main memory 100 in accordance with the line end signal and block end signal. Referring to FIG. 26, SA represents the start address of DMA transfer. Dot-sequential R, G, and B data are stored from this address in the main scanning direction. On the basis of the line end signal, the address of DMA transfer is switched by offset information (OFF1A). In a similar manner, data is stored in the main scanning direction from an address shifted in the sub-scanning direction by one pixel (line). On the basis of the block end signal of the rectangular area (0,0), processing shifts to data storage for the next rectangular area (1,0). The address of DMA transfer is switched by offset information (OFF2A). In this case, OFF2A is switched as an address shifted in the main scanning direction by one pixel with respect to the area (0,0) and jumped to the first line in the sub-scanning direction.

In a similar manner, data is stored in the areas (2,0), . . . , (n1,0), and (n,0). When n blocks are stored, the address of DMA transfer is switched by offset information (OFF3). In this case, OFF3 is switched as an address shifted in the sub-scanning direction by one pixel (line) with respect to the pixel of the final line of the area (0,0) and jumped to the first pixel in the main scanning direction.

As described above, when the offset information (OFF1A, OFF2A, or OFF3) is dynamically switched by the line end signal and block end signal, the data that has undergone the image processing can be DMA-transferred to a predetermined area of the main memory 100 and stored.

Other Embodiment

In the above embodiment, the present invention has been described as a composite image processing apparatus having various image input/output functions. However, the present invention is not limited to this and can also be applied to a scanner apparatus or printer apparatus having a single function or an optical card to be extendedly connected to another apparatus. In addition, the unit composition of the apparatus according to the present invention is not limited to the above description. For example, the apparatus or system according to the present invention may be constituted such that it is achieved by a plurality of apparatuses connected through a network.

The object of the present invention can also be achieved by supplying a storage medium which stores software program codes for implementing the functions of the above-described embodiment to a system or apparatus and causing the computer (or a CPU or MPU) of the system or apparatus to read out and execute the program codes stored in the storage medium. In this case, the program codes read out from the storage medium implement the functions of the above-described embodiment by themselves, and the storage medium which stores the program codes constitutes the present invention.

As the storage medium for supplying the program codes, for example, a floppy (trademark) disk, hard disk, optical disk, magnetooptical disk, CD-ROM, CD-R, magnetic tape, nonvolatile memory card, ROM, or the like can be used.

The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the embodiment of the present invention, an image processing apparatus which is compatible with various image reading devices can be provided. More specifically, image data read by an image reading device is distributed to channels that control DMA transfer in accordance with the output format. Address information and offset information, which control DMA for the distributed data, are generated. With this composition, the image processing apparatus can be compatible with various image reading devices.

In this embodiment, R, G, and B data are separated, and the image data are stored on the main memory 100 independently of the output format of the image reading device (CCD 17 or CIS 18). For this reason, DMA transfer corresponding to the output format of the image reading device (CCD 17 or CIS 18) need not be executed for the image processing section (to be described later) on the output side. Only DMA transfer corresponding to necessary image processing needs to be executed. Hence, an image processing apparatus that can be compatible with the output format of the image reading device (CCD 17 or CIS 18) with a very simple arrangement and control can be provided.

When a rectangular area corresponding to an image processing mode is set on the memory, and the unit of the rectangular area is switched, a resolution and high-resolution processing corresponding to the image processing mode can be implemented.

When a rectangular area containing a predetermined overlap width is set in accordance with the image processing mode, and image processing is executed for each rectangular area, predetermined image processing can be executed without intervention of individual line buffers of each image processing section.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   an interface unit connectable to any one of a first image reading device, a second image reading device and a third image reading device,
   wherein the first image reading device reads an image of an original and outputs the image of the original as a plurality of colors of image data, corresponding to one line in a main scanning direction for reading the image of the original, serially with a single data channel,
   wherein the second image reading device reads an image of the original and outputs the image of the original as a plurality of colors of image data, corresponding to one line in the main scanning direction, in parallel using a plurality of data channels corresponding to the number of colors, and
   wherein the third image reading device reads an image of the original and outputs the image of the original as a plurality of colors of image data, corresponding to each one of a plurality of partial lines obtained by dividing one line in the main scanning direction, serially using a plurality of data channels corresponding to each one of the plurality of partial lines,
   wherein the original is scanned for each line in the main scanning direction while moving a read position on the original in a sub-scanning direction perpendicular to the main scanning direction, in a case where any one of the first image reading device, the second image reading device and the third image reading device is connected to the interface unit, and
   a DMA-transfer unit constructed to generate address information for DMA-transferring the plurality of colors of image data to a memory and to DMA-transfer the plurality of color image data to the memory on the basis of the generated address information,
   wherein the DMA-transfer unit has a plurality of DMA-transferring portions corresponding to the plurality of data channels, and wherein the generated address information corresponds to the output format of the image reading device connected to the image processing apparatus,
   wherein any one DMA-transferring portion of the plurality of DMA-transferring portions generates the address information used for storing the plurality of colors of image data so that each color of the plurality of colors of image data is stored in different areas of the memory, in a case where the first image reading device is connected to said interface unit and the plurality of colors of image data corresponding to one line in the main scanning direction are inputted serially to any one DMA-transferring portion of the plurality of DMA-transferring portions,
   wherein each DMA-transferring portion of the plurality of DMA-transferring portions generates the address information used for storing the plurality of colors of image data so that each color of the plurality of the colors of image data is stored in different areas of the memory, in a case where the second image reading device is connected to said interface unit and the plurality of colors of image data corresponding to one line in the main scanning direction are inputted in parallel to each DMA-transferring portion of the plurality of DMA-transferring portions, and
   wherein each DMA-transferring portion of the plurality of DMA-transferring portions generates the address information used for storing the plurality of colors of image data so that each color of the plurality of the colors of image data is stored in different areas of the memory, in a case where the third image reading device is connected to said interface unit and the plurality of colors of image data corresponding to each one of the plurality of partial lines obtained by dividing one line in the main scanning direction are inputted in serial to each DMA-transferring portion of the plurality of DMA-transferring portions corresponding to each one of the plurality of partial lines,
   a second processing unit constructed to generate address information for reading out each color of the plurality of the colors of image data stored in the memory, and to read out each color of the plurality of the colors of image data based on the address information, without converting the plurality of colors of image data stored in the memory.

2. The apparatus according to claim 1, wherein said second processing unit reads out the plurality of colors of image data as rectangular area unit image data from rectangular areas generated by dividing the memory into a main scanning direction and a sub-scanning direction.

3. The apparatus according to claim 2, further comprising an image processing unit constructed to execute image processing to the rectangular area unit image data,
   wherein said second processing unit transfers the rectangular area unit image data from the memory to said image processing unit.

4. The apparatus according to claim 3, wherein said second processing unit transfers the rectangular area unit image data processed by said image processing unit from said image processing unit to the memory.

5. The apparatus according to claim 1, wherein
   the first image reading device can output serially single color image data using a single data channel, and
   said DMA-transfer unit DMA-transferring portion generates the address information corresponding to either single color image data outputted by the first image reading device or the plurality colors of image data outputted by the first image reading device.

6. The apparatus according to claim 1, wherein said first image reading device includes a CIS.

7. The apparatus according to claim 1, wherein said second image reading device includes a CCD.

8. An image processing method for an image processing apparatus connectable via an interface unit to any one of a first image reading device, a second image reading device and a third image reading device, wherein the first image reading device reads an image of an original and outputs the image of the original as a plurality of colors of image data, corresponding to one line in a main scanning direction for reading the image of the original, serially with a single data channel, wherein the second image reading device reads an image of the original and outputs the image of the original as a plurality of colors of image data, corresponding to one line in the main scanning direction, in parallel using a plurality of data channels corresponding to the number of a colors, and wherein the third image reading device reads an image of the original and outputs the image of the original as a plurality of colors of image data, corresponding to each one of a plurality of partial lines obtained by dividing one line in the main scanning direction, serially using a plurality of data channels corresponding to each one of the plurality of partial lines, wherein the original is scanned for each line in the main scanning direction while moving a read position on the original in a sub-scanning direction perpendicular to the main scanning direction, in a case where any one of the first image reading device, the second image reading device and the third image reading device is connected to the interface unit, said method comprising:

an input step of executing input processing of the plurality of colors of image data outputted by the first image reading device, the second image reading device or the third image reading device;

a first address generation step of generating address information for DMA-transferring the plurality of colors of image data inputted in said input step to a memory, wherein the generated address information corresponds to the output format of the image reading device connected to the image processing apparatus; and a first transfer step of DMA-transferring the plurality of colors of image data to the memory on the basis of the generated address information with a plurality of DMA-transferring portions corresponding to the plurality of data channels, wherein any one DMA-transferring portion of the plurality of DMA-transferring portions generates the address information used for storing the plurality of colors of image data so that each color of the plurality of the colors of image data is stored in different areas of the memory, in a case where the first image reading device is connected to said interface unit and the plurality of colors of image data corresponding to one line in the main scanning direction are inputted serially to any one DMA-transferring portion of the plurality of DMA-transferring portions, wherein each DMA-transferring portion of the plurality of DMA-transferring portions generates the address information used for storing the plurality of colors of image data so that each color of the plurality of the colors of image data is stored in different areas of the memory, in a case where the second image reading device is connected to said interface unit and the plurality of colors of image data corresponding to one line in the main scanning direction are inputted in parallel to each DMA-transferring portion of the plurality of DMA-transferring portions, and wherein each DMA-transferring portion of the plurality of DMA-transferring portions generates the address information used for storing the plurality of colors of image data so that each color of the plurality of the colors of image data is stored in different areas of the memory, in a case where the third image reading device is connected to said interface unit and the plurality of colors of image data corresponding to each one of the plurality of partial lines obtained by dividing one line in the main scanning direction are inputted in serial to each DMA-transferring portion of the plurality of DMA-transferring portions corresponding to each one of the plurality of partial lines, a second address generation step of generating address information for reading out each color of the plurality of the colors of image data stored in the memory; and a readout step of reading out each color of the plurality of the colors of image data based on the address information generated in the second address generation step, wherein each color of the plurality of the colors of image data is read out in the readout step without converting the plurality of the colors of image data stored in the memory.

9. The method according to claim 8, wherein the readout step reads out the plurality of colors of image data as rectangular area unit image data from rectangular areas generated by dividing the memory area into a main scanning direction and a sub-scanning direction.

10. The method according to claim 9, further comprising an image processing step of causing an image processing unit to execute image processing to the rectangular area unit image data, and a second transfer step of transferring the rectangular area unit image data from the memory to the image processing unit.

11. The method according to claim 10, wherein the second transfer step transfers the rectangular area unit image data processed by the image processing unit from the image processing unit to the memory.

12. The method according to claim 8, wherein the first image reading device includes a CIS.

13. The method according to claim 8, wherein the second image reading device includes a CCD.

* * * * *